US007216209B2

(12) United States Patent
Kasako

(10) Patent No.: US 7,216,209 B2
(45) Date of Patent: May 8, 2007

(54) DATA PROCESSING SYSTEM HAVING A PLURALITY OF STORAGE SYSTEMS

(75) Inventor: Naohisa Kasako, Odawara (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 10/765,128

(22) Filed: Jan. 28, 2004

(65) Prior Publication Data

US 2005/0132155 A1    Jun. 16, 2005

(30) Foreign Application Priority Data

Dec. 15, 2003    (JP)    ............................. 2003-416414

(51) Int. Cl.
*G06F 12/00*    (2006.01)
(52) U.S. Cl. ...................... 711/162; 707/200; 707/201; 709/217; 714/6
(58) Field of Classification Search ........ 711/161–162; 707/200–201; 714/6; 709/217
See application file for complete search history.

(56) References Cited

U.S. PATENT DOCUMENTS

| 4,993,030 | A | 2/1991 | Krakauer et al. |
| 5,155,845 | A | 10/1992 | Beal et al. |
| 5,170,480 | A | 12/1992 | Mohan et al. |
| 5,307,481 | A | 4/1994 | Shimazaki et al. |
| 5,379,418 | A | 1/1995 | Shimazaki et al. |
| 5,459,857 | A | 10/1995 | Ludlam et al. |
| 5,544,347 | A | 8/1996 | Yanai et al. |
| 5,555,371 | A | 9/1996 | Duyanovich et al. |
| 5,682,513 | A | 10/1997 | Candelaria et al. |
| 5,692,155 | A | * 11/1997 | Iskiyan et al. ............... 711/162 |

(Continued)

FOREIGN PATENT DOCUMENTS

EP    0 881 560 A2    5/1998

(Continued)

OTHER PUBLICATIONS

European Search Report dated Oct. 6, 2004.

(Continued)

*Primary Examiner*—Pierre Bataille
*Assistant Examiner*—Hetul Patel
(74) *Attorney, Agent, or Firm*—Reed Smith LLP; Stanley P. Fisher, Esq.; Juan Carlos A. Marquez, Esq.

(57) ABSTRACT

It is an object of the present invention to conduct data transfer or data copying between a plurality of storage systems, without affecting the host computer of the storage systems. Two or more auxiliary storage systems 100B, 100C are connected to a primary storage system 100A connected to a host device 180. The auxiliary storage systems 100B, 100C read journals of data update from the primary storage system 100A at respective independent timings, save the journals in prescribed logical volumes JNL 2, JNL 3, produce copying of the data present in the primary storage system 100A based on the journals present in the logical volumes JNL 2, JNL 3 at the independent timings, and save the copies in auxiliary logical volumes COPY 1, COPY 3. The primary storage system 100A holds the journals till both auxiliary storage systems 100B, 100C read the journals and restore. The timing of journal read can be controlled according to the journal quantity, processing load, and the like.

11 Claims, 25 Drawing Sheets

U.S. PATENT DOCUMENTS

| | | | |
|---|---|---|---|
| 5,720,029 | A | 2/1998 | Kern et al. |
| 5,734,818 | A | 3/1998 | Kern et al. |
| 5,742,792 | A | 4/1998 | Yanai et al. |
| 5,799,323 | A | 8/1998 | Mosher, Jr. et al. |
| 5,809,285 | A | 9/1998 | Hilland |
| 5,835,953 | A | 11/1998 | Ohran |
| 5,889,935 | A | 3/1999 | Ofek et al. |
| 5,901,327 | A | 5/1999 | Ofek |
| 5,933,653 | A | 8/1999 | Ofek |
| 5,974,563 | A | 10/1999 | Beeler, Jr. |
| 5,995,980 | A | 11/1999 | Olson et al. |
| 6,044,444 | A | 3/2000 | Ofek |
| 6,052,758 | A | 4/2000 | Crockett et al. |
| 6,092,066 | A | 7/2000 | Ofek |
| 6,101,497 | A | 8/2000 | Ofek |
| 6,148,383 | A * | 11/2000 | Micka et al. ............ 711/162 |
| 6,157,991 | A | 12/2000 | Arnon |
| 6,173,377 | B1 | 1/2001 | Yanai et al. |
| 6,178,427 | B1 | 1/2001 | Parker |
| 6,199,146 | B1 | 3/2001 | Pence |
| 6,209,002 | B1 * | 3/2001 | Gagne et al. ............ 707/204 |
| 6,282,610 | B1 | 8/2001 | Bergsten |
| 6,308,283 | B1 | 10/2001 | Galipeau et al. |
| 6,324,654 | B1 | 11/2001 | Wahl et al. |
| 6,324,854 | B1 | 12/2001 | Jayanth |
| 6,336,173 | B1 | 1/2002 | Day, III et al. |
| 6,360,306 | B1 | 3/2002 | Bernsten |
| 6,363,385 | B1 * | 3/2002 | Kedem et al. ............ 707/10 |
| 6,363,462 | B1 | 3/2002 | Bergsten |
| 6,389,432 | B1 | 5/2002 | Pothapragada et al. |
| 6,393,538 | B2 | 5/2002 | Murayama |
| 6,397,307 | B2 | 5/2002 | Ohran |
| 6,408,370 | B2 | 6/2002 | Yamamoto et al. |
| 6,442,706 | B1 | 8/2002 | Wahl et al. |
| 6,446,161 | B1 | 9/2002 | Yamamoto et al. |
| 6,446,176 | B1 | 9/2002 | West et al. |
| 6,460,055 | B1 | 10/2002 | Midgley et al. |
| 6,463,501 | B1 * | 10/2002 | Kern et al. ............ 711/100 |
| 6,467,034 | B1 | 10/2002 | Yanaka |
| 6,477,627 | B1 | 11/2002 | Ofek |
| 6,484,187 | B1 | 11/2002 | Kern et al. |
| 6,487,645 | B1 | 11/2002 | Clark et al. |
| 6,496,908 | B1 | 12/2002 | Kamvysselis et al. |
| 6,498,908 | B2 | 12/2002 | Phillips et al. |
| 6,526,487 | B2 | 2/2003 | Ohran et al. |
| 6,560,617 | B1 | 5/2003 | Winger et al. |
| 6,560,673 | B2 | 5/2003 | Elliott |
| 6,598,134 | B2 | 7/2003 | Ofek et al. |
| 6,601,101 | B1 | 7/2003 | Lee et al. |
| 6,622,152 | B1 | 9/2003 | Sinn et al. |
| 6,625,623 | B1 | 9/2003 | Midgley et al. |
| 6,662,197 | B1 | 12/2003 | LeCrone et al. |
| 6,676,260 | B2 | 1/2004 | Cobb et al. |
| 6,711,571 | B2 | 3/2004 | Putzolu |
| 6,745,303 | B2 | 6/2004 | Watanabe |
| 6,779,003 | B1 | 8/2004 | Midgley et al. |
| 6,804,676 | B1 | 10/2004 | Bains, II |
| 6,823,336 | B1 | 11/2004 | Srinivasan et al. |
| 6,883,122 | B2 | 4/2005 | Maple et al. |
| 6,941,322 | B2 | 9/2005 | Bills et al. |
| 6,959,369 | B1 | 10/2005 | Ashton et al. |
| 6,968,349 | B2 | 11/2005 | Owen et al. |
| 7,076,620 | B2 | 7/2006 | Takeda et al. |
| 2001/0029570 | A1 | 10/2001 | Yamamoto et al. |
| 2002/0004857 | A1 | 1/2002 | Arakawa et al. |
| 2002/0091898 | A1 | 7/2002 | Matsunami et al. |
| 2002/0103889 | A1 | 8/2002 | Markson et al. |
| 2002/0133511 | A1 | 9/2002 | Hostetter et al. |
| 2002/0143888 | A1 | 10/2002 | Lisiecki et al. |
| 2003/0005355 | A1 | 1/2003 | Yanai et al. |
| 2003/0014432 | A1 | 1/2003 | Teloh et al. |
| 2003/0014433 | A1 | 1/2003 | Teloh et al. |
| 2003/0074378 | A1 | 4/2003 | Midgley et al. |
| 2003/0074600 | A1 | 4/2003 | Tamatsu |
| 2003/0084075 | A1 | 5/2003 | Balogh et al. |
| 2003/0204479 | A1 | 10/2003 | Bills et al. |
| 2003/0217031 | A1 | 11/2003 | Owen et al. |
| 2003/0220935 | A1 | 11/2003 | Vivian et al. |
| 2003/0229764 | A1 | 12/2003 | Ohno et al. |
| 2004/0030703 | A1 | 2/2004 | Bourbonnais et al. |
| 2004/0059738 | A1 | 3/2004 | Tarbell |
| 2004/0117344 | A1 | 6/2004 | Yang |
| 2004/0139128 | A1 | 7/2004 | Becker et al. |
| 2004/0267829 | A1 * | 12/2004 | Hirakawa et al. ............ 707/200 |
| 2005/0038968 | A1 | 2/2005 | Iwamura et al. |
| 2005/0050115 | A1 | 3/2005 | Kekre |
| 2005/0273565 | A1 * | 12/2005 | Hirakawa et al. ............ 711/162 |

FOREIGN PATENT DOCUMENTS

| | | |
|---|---|---|
| EP | 0 902 370 A2 | 9/1998 |
| EP | 0 981 091 A2 | 8/1999 |
| EP | 1 283 469 A2 | 3/2002 |
| JP | 62-274448 | 5/1986 |
| JP | 02-037418 | 7/1988 |
| JP | 07-191811 | 12/1993 |
| JP | 07-244597 | 12/1994 |
| JP | 2000-276406 | 3/1999 |

OTHER PUBLICATIONS

"IBM DB2 DataPropagator for z/OS, Version 8.1", DB2 Data Management Software, 4 pages.

"IBM DB2 DataPropagator for z/OS, Version 3.1", DB2 Data Management Software, 2 pages.

Jim Lyon, "Tandem's Remote Data Facility" 1990 IEEE, pp. 562-567.

"Replication Guide and Reference, Version 7", IBM DB2 Universal Database, pp. iii-xx and 1-430.

* cited by examiner

FIG. 4

| SET ITEM | SETTING VALUE EXAMPLE |
|---|---|
| TIME OF WRITE COMMAND RECEPTION | 1993/3/17, 22:20:10 |
| GROUP NUMBER | 1 |
| UPDATE NUMBER | 4 |
| LOGICAL ADDRESS OF WRITE COMMAND | LOGICAL VOLUME NUMBER: 1 LOCATION OF LOGICAL VOLUME FROM HEAD OF STORAGE AREA: 700 |
| DATA SIZE OF WRITE DATA | 300 |
| LOGICAL ADDRESS OF JOURNAL LOGICAL VOLUME STORING THE WRITE DATA | LOGICAL VOLUME NUMBER: 4 LOCATION OF LOGICAL VOLUME FROM HEAD OF STORAGE AREA: 1500 |

310 UPDATE INFORMATION

FIG. 5

| LOGICAL VOLUME NUMBER | VOLUME STATE | FORMAT SYSTEM | CAPACITY (GB) | PAIR NUMBER | PHYSICAL ADDRESS | |
|---|---|---|---|---|---|---|
| | | | | | STORAGE DEVICE NUMBER | LOCATION FROM THE HEAD |
| 1 | NORMAL | OPEN3 | 3 | 1 | 1 | 0 |
| 2 | NORMAL | OPEN6 | 6 | 2 | 1 | 3 |
| 3 | UNUSED | OPEN6 | 6 | 0 | 1 | 9 |
| 4 | NORMAL | OPEN9 | 9 | 0 | 2 | 0 |
| 5 | NORMAL | OPEN3 | 3 | 0 | 2 | 9 |
| 6 | UNUSED | OPEN6 | 6 | 0 | 2 | 12 |

400 VOLUME INFORMATION

FIG. 6

| PAIR NUMBER | PAIR STATE | PRIMARY STORAGE SYSTEM NUMBER | PRIMARY LOGICAL VOLUME NUMBER | AUXILIARY STORAGE SYSTEM NUMBER | AUXILIARY LOGICAL VOLUME NUMBER | GROUP NUMBER | COPY COMPLETION ADDRESS |
|---|---|---|---|---|---|---|---|
| 1 | NORMAL | 1 | 1 | 2 | 1 | 1 | 0 |
| 2 | NORMAL | 1 | 2 | 2 | 3 | 1 | 0 |
| 3 | UNUSED | 0 | 0 | 0 | 0 | 0 | 0 |
| 4 | UNUSED | 0 | 0 | 0 | 0 | 0 | 0 |
| 5 | UNUSED | 0 | 0 | 0 | 0 | 0 | 0 |

500 PAIR INFORMATION

FIG. 7

| GROUP NUMBER | GROUP STATE | PAIR SET | JOURNAL LOGICAL VOLUME NUMBER | UPDATE NUMBER |
|---|---|---|---|---|
| 1 | NORMAL | 1,2 | 4 | 4 |
| 2 | UNUSED | 0 | 0 | 0 |

600 GROUP INFORMATION

FIG. 8

| | AUXILIARY STORAGE SYSTEM NUMBER | LOGICAL ADDRESS | |
|---|---|---|---|
| | | LOGICAL VOLUME NUMBER | POSITION OF LOGICAL VOLUME FROM THE HEAD OF STORAGE AREA |
| UPDATE INFORMATION AREA HEAD ADDRESS | 2 | 4 | 0 |
| WRITE DATA AREA HEAD ADDRESS | 2 | 4 | 700 |
| UPDATE INFORMATION NEWEST ADDRESS | 2 | 4 | 500 |
| UPDATE INFORMATION OLDEST ADDRESS | 2 | 4 | 200 |
| WRITE DATA NEWEST ADDRESS | 2 | 4 | 2200 |
| WRITE DATA OLDEST ADDRESS | 2 | 4 | 1300 |
| READ START ADDRESS | 2 | 4 | 400 |
| RETRY START ADDRESS | 2 | 4 | 300 |

700 POINTER INFORMATION

FIG. 15

| SET ITEM | SETTING VALUE EXAMPLE |
|---|---|
| TIME OF WRITE COMMAND RECEPTION | 1993/3/17, 22:22:10 |
| GROUP NUMBER | 1 |
| UPDATE NUMBER | 4 |
| LOGICAL ADDRESS OF WRITE COMMAND | LOGICAL VOLUME NUMBER: 1<br>LOCATION OF LOGICAL VOLUME FROM HEAD OF STORAGE AREA: 800 |
| DATA SIZE OF WRITE DATA | 100 |
| LOGICAL ADDRESS OF JOURNAL LOGICAL VOLUME STORING THE WRITE DATA | LOGICAL VOLUME NUMBER: 4<br>LOCATION OF LOGICAL VOLUME FROM HEAD OF STORAGE AREA: 2200 |

310
UPDATE INFORMATION

FIG. 26

| | AUXILIARY STORAGE SYSTEM NUMBER | LOGICAL ADDRESS LOGICAL VOLUME NUMBER | POSITION OF LOGICAL VOLUME FROM THE HEAD OF STORAGE AREA |
|---|---|---|---|
| UPDATE INFORMATION AREA HEAD ADDRESS | 2 | 4 | 0 |
| WRITE DATA AREA HEAD ADDRESS | 2 | 4 | 700 |
| UPDATE INFORMATION NEWEST ADDRESS | 2 | 4 | 500 |
| UPDATE INFORMATION OLDEST ADDRESS | 2 | 4 | 200 |
| WRITE DATA NEWEST ADDRESS | 2 | 4 | 2200 |
| WRITE DATA OLDEST ADDRESS | 2 | 4 | 1300 |
| READ START ADDRESS | 2 | 4 | 400 |
| RETRY START ADDRESS | 2 | 4 | 300 |

700B POINTER INFORMATION

| | AUXILIARY STORAGE SYSTEM NUMBER | LOGICAL ADDRESS LOGICAL VOLUME NUMBER | POSITION OF LOGICAL VOLUME FROM THE HEAD OF STORAGE AREA |
|---|---|---|---|
| UPDATE INFORMATION AREA HEAD ADDRESS | 3 | 4 | 0 |
| WRITE DATA AREA HEAD ADDRESS | 3 | 4 | 700 |
| UPDATE INFORMATION NEWEST ADDRESS | 3 | 4 | 500 |
| UPDATE INFORMATION OLDEST ADDRESS | 3 | 4 | 300 |
| WRITE DATA NEWEST ADDRESS | 3 | 4 | 2200 |
| WRITE DATA OLDEST ADDRESS | 3 | 4 | 1500 |
| READ START ADDRESS | 3 | 4 | 500 |
| RETRY START ADDRESS | 3 | 4 | 400 |

700C POINTER INFORMATION

DATA PROCESSING SYSTEM HAVING A PLURALITY OF STORAGE SYSTEMS

CROSS-REFERENCE TO RELATED APPLICATIONS

This application relates to and claims priority from Japanese Patent Application No. 2003-416414 filed on Dec. 15, 2003, the entire disclosure of which is incorporated herein by reference.

BACKGROUND OF THE INVENTION

1. Field of the Invention

The present invention relates to a data processing system having a plurality of storage systems, and more particularly to data copying between a plurality of storage systems.

2. Description of the Related Art

In recent years, a technology relating to data copying between storage systems has gained importance by allowing a data processing system to be able to provide services to a customer even when a failure has occurred in the first storage system, in order to provide continual service to the customer. Technology for copying the information stored in the first storage system into the second and third storage systems was disclosed in the following patent references.

U.S. Pat. No. 5,170,480 discloses a technology in which a first computer connected to a first storage system transfers the data stored in the first storage system to a second computer via a communication link between the first computer and the second computer, and the second computer transfers the data to the second storage system connected to the second computer.

U.S. Pat. No. 6,209,002 discloses a technology in which a first storage system transfers the data stored in the first storage system to the second storage system, and the second storage system transfers the data to the third storage system. The computer and the first storage system are connected by a communication link, the first storage system and the second storage system are connected by a communication link, and the second storage system and the third storage system are connected by a communication link. The first storage system holds a first logical volume which is the copying object. The second storage system holds a second logical volume which is the copy of the first logical volume and a third logical volume which is the copy of the second logical volume. The third storage system holds a fourth logical volume which is the copy of the third logical volume. In this patent reference, the second storage system executes exclusively the data copying processing from the second logical volume to the third logical volume and the data copying processing from the third logical volume to the fourth logical volume.

The technology disclosed in U.S. Pat. No. 5,170,480 constantly uses the first computer and the second computer for data copying. The first computer conducts usual operations and the load of data copying processing applied to the first computer cannot be ignored. Another problem is that because data for copying use a communication link between the first computer and the first storage system, those data collide with the data transfer necessary for usual operations and the data reference and data update time necessary for usual operations are extended.

With the technology disclosed in U.S. Pat. No. 6,209,002, the storage capacity multiple of the data quantity which is to be copied is required for the second storage system and the third storage system. Furthermore, when the data quantity which is the object of copying is large, the time consumed by the data copying processing is increased and data in the third storage system become old. The resulting problem is that when operations are restarted by using the data of the third storage system, a long time is required to renew the data of the third storage system and the time required to restart the operations is extended. Furthermore, according to the description provided in this reference, the first storage system in addition to data update processing in the first storage system also conducts data update completion reporting to the host computer when data update processing with the second storage system has ended. Therefore, a long time is consumed for data update from the computers, and the time required for data update extends with the increase in the distance between the first storage system and the second storage system. The resulting problem is that the distance between the two storage systems cannot be made too large.

SUMMARY OF THE INVENTION

It is an object of the present invention to conduct data transfer or data copying between a plurality of storage systems, without affecting the host computer of the storage systems.

It is another object of the present invention to conduct data transfer or data copying between a plurality of storage systems, without affecting the communication between the storage systems and the computer.

It is yet another object of the present invention to reduce a data storage area held in a plurality of storage systems.

It is still another object of the present invention to conduct rapidly and effectively data transfer or data copying between a plurality of storage systems, so as to produce no effect on the operation of the host computer of the plurality of storage systems.

The data processing system according to one aspect of the present invention comprises a first storage system communicably connected to a host unit and a second storage system and a third storage system each communicably connected to the first storage system.

The first storage system comprises a first control unit, a first data storage area for storing data transmitted from the host unit, and a first journal storage area for storing the journal used for producing a copy of data stored in the first storage area. The first control unit writes the data transmitted from the host unit into the first data storage area, writes the journal of the data written into the first data storage area into the first journal storage area, and transmits the journal present in the first journal storage area to each of the second and third storage systems in response to a request from each of the second and third storage systems.

The second storage system comprises a second control unit, a second data storage area for storing a copy of the data present in the first data storage area, and a second journal storage area for storing the journal. The second control unit reads the journal from the first storage system at an independently scheduled journal read timing, writes the read-out journal into the second journal storage area, produces a copy of the data present in the first storage area based on the journal present in the second journal storage area at an independently scheduled restore timing, and writes the copy into the second data storage area.

The third storage system comprises a third control unit, a third data storage area for storing a copy of the data present in the first data storage area, and a third journal storage area for storing the journal. The third control unit reads the journal from the first storage system at an independently scheduled journal read timing, writes the read-out journal into the third journal storage area, produces a copy of the data present in the first data storage area based on the journal present in the third journal storage area at an independently scheduled restore timing, and writes the copy into the third data storage area.

Further, the first control unit in the first storage system detects as to whether or not the journal present in the first journal storage area has been read by the second and third storage systems. The first control unit holds the journal present in the first journal storage area till it is read by both the second storage system and the third storage system, and can delete the journal present in the first journal storage area after the journal has been read by both the second storage system and the third storage system.

The third control unit of the third storage system may be adapted to control the time interval of journal read according to the number of data in the journal that has been read from the first journal storage area. Alternatively, the third control unit may be adapted to control the time interval of journal read according to the communication quantity of the data exchanged between the first storage system and the third storage system. Alternatively, the third control unit may be adapted to control the time interval of journal read according to the storage capacity of the journal held in the third data storage area. Alternatively, the third control unit may be adapted to control the time interval of journal read according to the processing load of the third storage system. Alternatively, the third control unit may be adapted to read from the first storage system information relating to the storage capacity of the journal held in the first journal storage area in the first storage system and to control the time interval of journal read according to the information relating to the storage capacity of the journal that was read out. Alternatively, the first storage system may own management information relating to the first journal storage area, and the third control unit of the third storage system may read from the first storage system the management information relating to the first journal storage area, which is owned by the first storage system, and may control the time interval of journal read according to the management information relating to the first journal storage area that was read out. The second control unit of the second storage system basically may be adapted to control the time interval of journal read in the same manner as described above.

The first data storage area in the first storage system can be composed of a plurality of logical volumes. The first control unit can write into the first journal storage area a plurality of journals each corresponding to a plurality of data stored in this plurality of logical volumes. Information relating to an update sequence of the corresponding plurality of data can be contained in a plurality of journals stored in the first journal storage area. Each of the second and third control units of the second and third storage systems can produce copies of a plurality of data based on the plurality of journals according to the update sequence contained in the plurality of journals read out from the first storage system and to write those copies in respective second and third data storage areas.

The third storage system may be adapted to control the restore timing according to the processing load of the third storage system.

The data processing system according to another aspect of the present invention comprises a first storage system communicably connected to a host unit and a second storage system and a third storage system each communicably connected to the first storage system.

The first storage system comprises a first control unit, a first data storage area for storing data transmitted from the host unit, and a first journal storage area for storing a journal used for producing a copy of data stored in the first storage area. The first control unit of the first storage system writes the data transmitted from the host unit into the first data storage area and writes the journal of the data that has been written, into the first journal storage area.

The second storage system comprises a second control unit and a second journal storage area for storing the journal. The second control unit of the second storage system reads the journal from the first storage system at a prescribed journal read timing and writes the read-out journal into the second journal storage area.

The third storage system comprises a third control unit and a third journal storage area for storing the journal. The third control unit of the third storage system reads the journal from the first storage system at a prescribed journal read timing and writes the read-out journal into the third journal storage area.

The second storage system also can additionally comprise a second data storage area for storing a copy of the data. The second control unit may be adapted to produce a copy of the data from the journal stored in the second journal storage area at the prescribed restore timing, and to write the produced copies of the data into the second data storage area.

The third storage system also can additionally comprise a third data storage area for storing a copy of the data. The third control unit may be adapted to produce a copy of the data from the journal stored in the third journal storage area at the prescribed restore timing, and to write the produced copies of the data into the third data storage area.

The first control unit of the first storage system may be adapted to detect as to whether or not the journal present in the first journal storage area has been read by the second and third storage systems, to hold the journal present in the first journal storage area till it is read by both the second and the third storage system, and to delete the journal present in the first journal storage area after the journal has been read by both the second and the third storage system.

BRIEF DESCRIPTION OF THE DRAWINGS

FIG. 4 illustrates a specific example of update information contained in the journal;

FIG. 5 illustrates an example of volume information of the first embodiment;

FIG. 6 illustrates an example of pair information of the first embodiment;

FIG. 7 illustrates an example of group information of the first embodiment;

FIG. 8 illustrates an example of pointer information of the first embodiment;

FIG. 15 illustrates an example of update information at the time of journal creation processing of the first embodiment;

FIG. 26 illustrates an example of pointer information of the fourth embodiment.

DESCRIPTION OF THE PREFERRED EMBODIMENT

The preferred embodiments of the data processing system in accordance with the present invention will be described below in greater detail with reference to the appended drawings.

Figure 1:
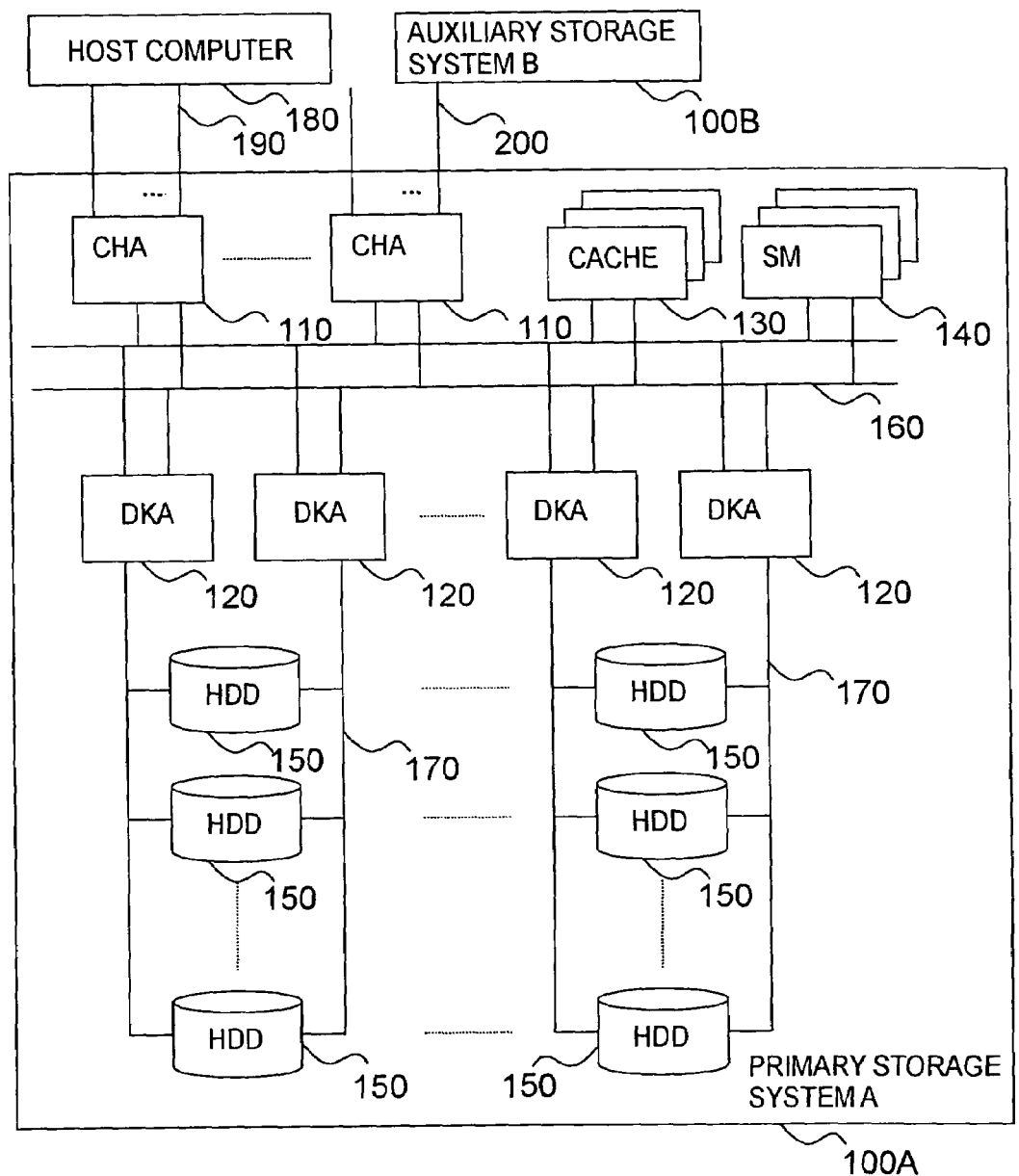
FIG. 1 is a block diagram illustrating the physical structure of the data processing system of the first embodiment in accordance with the present invention.
Figure 2:
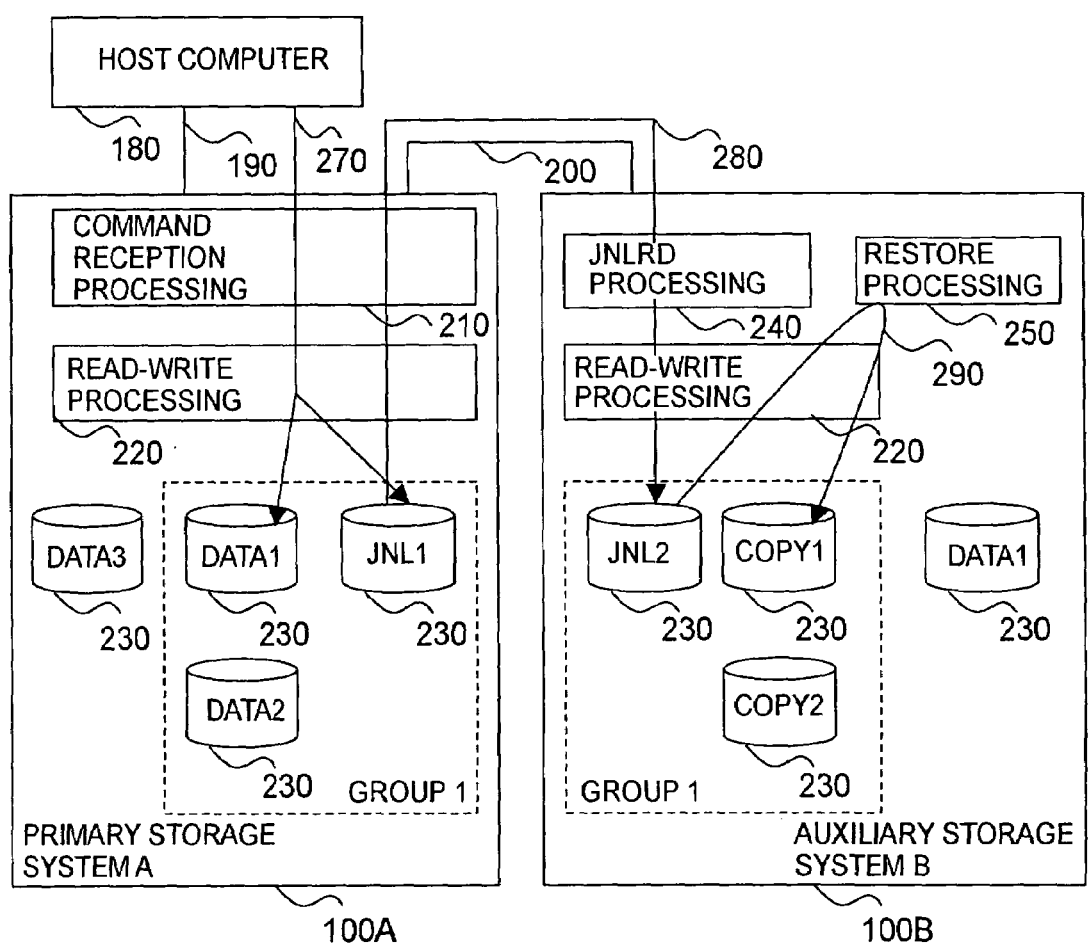
FIG. 2 is a block diagram illustrating the logical structure of the data processing system the first embodiment.

FIG. 1 is a block diagram illustrating the physical structure of one embodiment of the data processing system in accordance with the present invention. FIG. 2 is a block diagram illustrating the logical structure of the present embodiment.

As shown in FIG. 1 and FIG. 2, in this data processing system, a host computer 180 and a storage system 100A are connected by a connection path 190. Further, the storage system 100A and another storage system 100B are connected by a connection path 200. The storage system 100B is used for holding a copy of the data saved in the storage system 100A. In the explanation provided hereinbelow, in order to distinguish easily between the storage system 100A holding the data which is the object of copying and the storage system 100B for holding the copied data, the former storage system 100A will be referred to as a "primary storage system" and the latter storage system 100B will be referred to as an "auxiliary storage system".

Physical structures of the primary storage system 100A and the auxiliary storage system 100B will be explained hereinbelow with reference to FIG. 1.

Because the primary storage system 101A and the auxiliary storage system 100B basically have identical physical structures, only the structure of the primary storage system 101A is shown as a representative structure in FIG. 1. As shown in FIG. 1, the primary storage system 100A comprises at least one channel adapter 110, at least one disk adapter 120, at least one cache memory 130, at least one shared memory 140, at least one physical storage unit (for example, a hard disk drive) 150, at least one common path 160, and at least one connection line 170. The channel adapter 110, disk adapter 120, cache memory 130, and shared memory 140 are connected to each other by the common path 160. The common path 160 may be duplicated in the event of failure of the common path 160. The disk adapter 120 and the physical storage unit 150 are connected to each other by a connection line 170. Furthermore, a maintenance monitor (not shown in the figures) for conducting setting, monitoring, and maintenance of the storage systems 100 is connected to all the channel adapters 110 and disk adapters 120 by using a special line.

The channel adapter 110 is connected to the host computer 180 or the other storage system (for example the auxiliary storage system 100B) by the connection line 190 or the connection line 200. The channel adapter 110 controls data transfer between the host computer 180 and the cache memory 130, or data transfer between the other storage system and the cache memory 130. The disk adapter 120 control data transfer between cache memory 130 and the physical storage unit 150. The cache memory 130 is a memory for holding temporarily the data received from the host computer 180 or the other storage system, or the data read out from the physical storage unit 150. The shared memory 140 is a memory shared by all the channel adapters 110 and disk adapters 120 in the storage systems 100. A variety of information (for example, the below described volume information 400, pair information 500, group information 600, and pointer information 700) for control or management which is used mainly by the channel adapter 110 and disk adapter 120 is stored and hold in the shared memory 140. The physical structure of the auxiliary storage system 100B is basically identical to the above-described structure.

The logical structure of the storage systems 100A and 100B will be described below with reference to FIG. 2.

As shown in FIG. 2, the entire storage area provided by the physical storage units 150, 150, . . . in each of the storage systems 100A and 100B is managed by dividing in multiple logical storage areas 230, 230, . . . . . Individual logical storage areas 230 will be referred to hereinbelow as "logical volumes". The capacity of each logical volume 230 and the physical storage position (physical address) in the storage systems 100A or 100B can be indicated from a terminal computer (not shown in the figures) for maintenance which is connected to the storage system 100A or 100B or the host computer 180. The physical address of each logical volume 230 is stored in the below-described volume information 400. The physical address is composed, for example, of the number (storage unit number) identifying a physical storage unit 150 in the storage system 100A or 100B and a numerical value uniquely specifying the storage area in the storage unit 150 (for example, a location from the head of the storage area in the physical storage unit 150). In the explanation below, it will be assumed that the physical address is represented by a set of the storage unit number of the physical storage unit 150 and the location from the head of the storage area in the physical storage unit 150. In the storage system following a commonly used RAID principle, one logical volume 230 corresponds to a plurality of physical storage areas in a plurality of physical storage units 150. To facilitate explanation hereinbelow, it will be assumed that one logical volume 230 corresponds to one storage area in one physical storage unit 150. However, those skilled in the art can easily comprehend that the principle of the present invention can be also applied in accordance with the explanation provided hereinbelow to storage systems based on the RAID principle.

Data stores in the storage systems 100A, 100B can be uniquely specified by the number (logical volume number) identifying the logical volume 230 where the data is present and the numerical value (for example, a location from the head of the storage area in the logical volume 230) which uniquely indicates the storage area of the data in the logical volume 230. In the explanation below, the logical address is considered to be represented by a set of the logical volume number of the logical volume 230 and the location (location in the logical volume) from the head of the storage area in the logical volume 230.

In the explanation below, in order to distinguish easily between the logical volume of the copying object and the logical volume which is the copy thereof, the former will be referred to as a "primary logical volume" and the second will be referred to as an "auxiliary logical volume". A pair of the primary logical volume and auxiliary logical volume will be called "a pair". Information on the relation and state of the primary logical volume and auxiliary logical volume is stored in the below-described pair information 500.

A management unit called "a group" is provided to match the data update sequences between a plurality of primary logical volumes and a plurality of auxiliary logical volumes which constitute pairs with respective primary logical volumes. For example, let us assume a case in which the host computer 180 conducts processing in which it updates a first data in the first primary logical volume and then reads out the first data and updates a second data in the second primary logical volume by using the first data. In this case, if the data copying processing from the first primary logical volume to the first auxiliary logical volume and the data copying processing from the second primary logical volume to the second auxiliary logical volume are conducted independently, copying processing of the second data into the second auxiliary logical volume is sometimes conducted prior to copying processing of the first data into the first auxiliary logical volume. In such a case, if a failure occurs and copying processing into first auxiliary logical volume is terminated after the copying processing of the second data into the second auxiliary logical volume, but before the copying processing of the first data into the first auxiliary logical volume is completed, then compatibility of data between the first auxiliary logical volume and second auxiliary logical volume is lost. In this case, update sequence control using "a group" is carried out to maintain the compatibility of data between the first auxiliary logical volume and second auxiliary logical volume. Thus, a plurality of logical volumes which require matching of data update sequences between the primary logical volume and auxiliary logical volume are catalogued in the same group. The update number of the below-described group information 600 is allocated to each data update conducted in the primary logical volume belonging to this group. Copying of the updated data into the auxiliary logical volume is carried out in the order of the update numbers. For example, in the case illustrated by FIG. 2, the two primary logical volumes "DATA 1" and "DATA 2" within the primary storage system 100A constitute one group "Group 1". The two auxiliary logical volumes "COPY 1" and "COPY 2" which are the copies of the two primary logical volumes "DATA 1" and "DATA 2" constitute the same group "Group 1" in the auxiliary storage system 100B.

When the data of the primary logical volume which is the object of data copying are updated, a journal relating to this data update is created for usage in updating the data of the auxiliary logical volume, and this journal is saved in the prescribed logical volume in the primary storage system 100A. In the present embodiment, a logical volume (referred to hereinbelow as a journal logical volume) for saving only the journal of this group is allocated to each group in the primary storage system 100A. In the example shown in FIG. 2, a journal logical volume "JNL 1" is allocated to the group "Group 1". A journal logical volume is also allocated to each group in the auxiliary storage system 100B. In the example shown in FIG. 1, a journal logical volume "JNL 2" is allocated to the group "Group 1" in the auxiliary storage system. The journal logical volume "JNL 2" in the auxiliary storage system 100B is used for holding the journal of "Group 1" transferred from the primary storage system 100A to the auxiliary storage system 100B. Holding the journal in the journal logical volume in the auxiliary storage system 100B makes it unnecessary to conduct data update of the auxiliary logical volume during journal reception, and data of the auxiliary logical volume can be updated based on this journal in a subsequent period which is not synchronous with journal reception, for example, when the load of the auxiliary storage system 100B is low.

Furthermore, when there are multiple connection lines 200 between the primary storage system 100A and the auxiliary storage system 100B, a multiplex transfer of the journal from the primary storage system 100A to the auxiliary storage system 100B can be conducted and transfer capacity of the multiple connection lines 200 can be used effectively. There is a possibility that a large number of journals will be retained in the auxiliary storage system 100B if the prescribed update sequence is protected, but if the journals that cannot be used immediately for data updating the auxiliary logical volume are saved in the journal logical volume, the cache memory can be released.

The above-mentioned journal is composed or write data and update information. The update information is the information for managing the write data, and this information includes the instant of time at which the write command was received, the group number, the update number of the below-described group information 600, the logical address of the write command, the data size of the write data, and the logical address of the journal logical volume storing the write data. The update information may also hold only the instant of time at which the write command was received and the update number. When the write command creation time is contained in the write command from the host computer 180, the command creation time contained in the write command may be used instead of the instant of time at which the write command was received.

Figure 3:
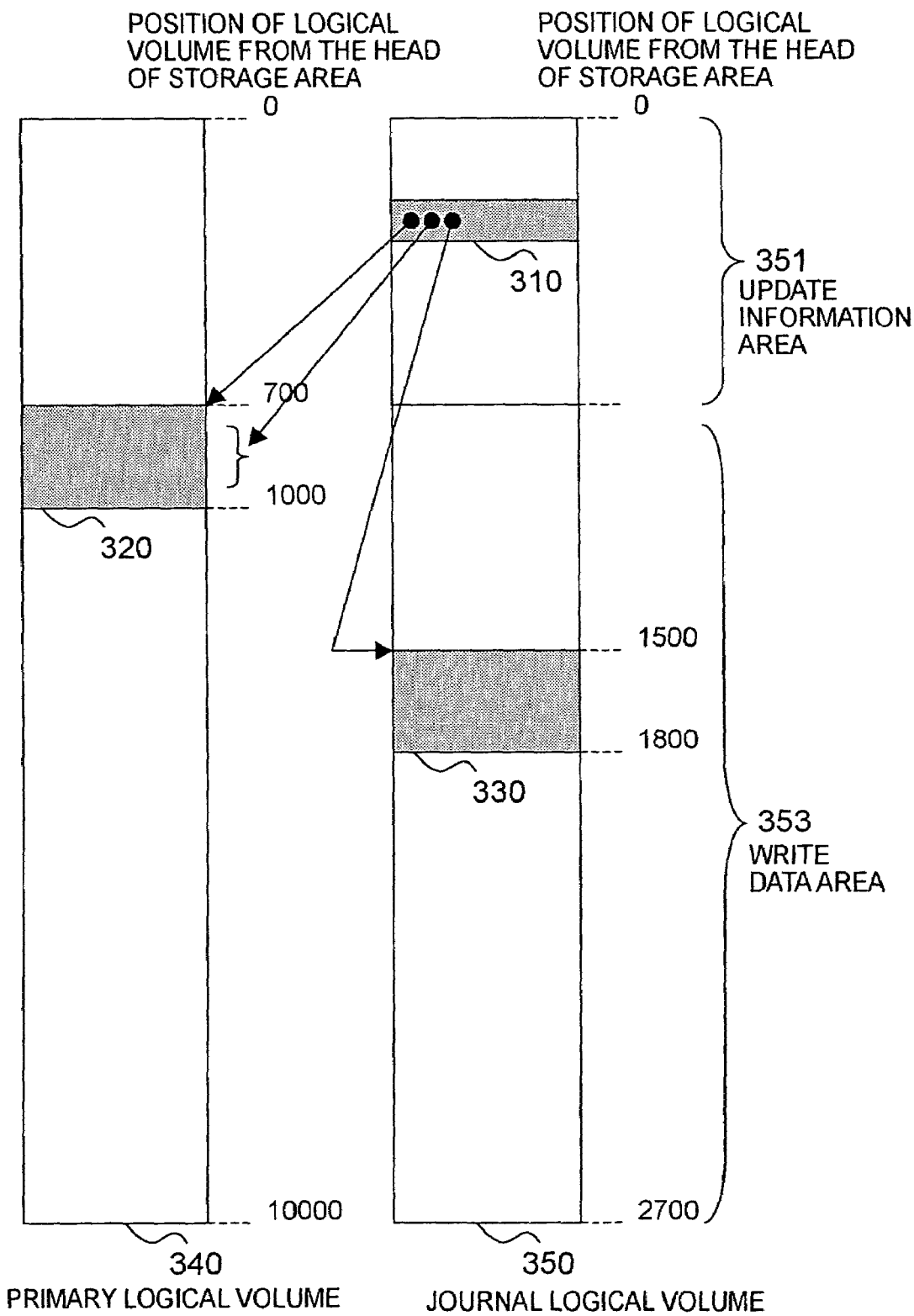
FIG. 3 illustrates the relationship between the update information of the journal and the write data.

An example of relation between the update information and write data of the journal is shown in FIG. 3.

As shown in FIG. 3, the journal logical volume 350 can be used upon division, for example, into a storage area (update information area) 351 for storing the update information and a storage area (write data area) 353 for storing the write data. The update information 310 of the write data 320 written into the primary logical volume 34 is stored in the order of update numbers from the head of the update information area 351 of the journal logical volume 350. If the storage location of certain update information 310 has reached the end of the update information area 351, subsequent update information 310 is stored from the head of the update information area 351. The write data 330 corresponding to the write data 320 written into the primary logical volume 34 is stored in the order to update numbers from the head of the write data area 353 of the journal logical volume 350. If the storage location of certain write data 330 reaches the end of the write data area 353, subsequent write data 330 is stored from the head of the write data area 351. Further, the size ratio of the update information area 351 and write data area 353 may be a fixed value and may be set to a random value via a maintenance terminal or host computer 180. Information such as the address indicating the range of update information area 351 and write data area 353 in the journal logical volume 350 or the address indicating the storage location of the newest and oldest update information 310 and write data 330 is stored in the below-described pointer information 700. In the explanation below, the journal logical volume 350 is used upon dividing into the update information 351 and write data area 353, but a method for continuously storing the update information 310 and write data 330 of each journal from the head of the journal logical volume 350 may be also employed as a modification example.

FIG. 4 shows a specific example of the update information 310 of the journal.

The write command reception time such as "Mar. 17, 1999, 10 PM, 20 min, 10 sec" is stored in the update information 310 shown as a example in FIG. 4. It is recorded in the update information 310 that the aforesaid write command was a command for storing the write data 320 in the location "700" from the head of the storage area of the logical volume with a logical volume number "1" and that the size of write data was "300". Furthermore, it is also recorded in the update information 310 that the write data 310 of the journal is stored from the position "1500" from the head of the storage area with a logical volume number "4" (journal logical volume). Moreover, it is further recorded in the update information 310 that the logical volume with a logical volume number "1" belongs to group "1" and that the data update according to the write command is a data update with number "4" from the data copying start of group "1".

Again referring to FIG. 2, the primary storage system 100A has functions of conducting a command reception processing 210 for receiving a data read/write command from the host computer 180 and a read-write processing 220 for reading/writing the data from/into the appropriate logical volume 230. The auxiliary storage system 100B has functions of conducting a journal read (JNLRD) processing 240 for reading the journal from the primary storage system 100A, a read-write processing 220 for reading/writing the data from/into the appropriate logical volume 230, and a restore processing 250 for updating the data present in the appropriate auxiliary logical volume 230 based on the journal from the primary storage system 100A. Those processing functions are executed by the channel adapter 110, disk adapter 120, cache memory 130, and shared memory 140 shown in FIG. 2.

The operation of reflecting the data update to the primary logical volume of the primary storage system 100A in the auxiliary logical volume of the auxiliary storage system 100B will be briefly explained below with reference to FIG. 2.

(1) If the primary storage system 100A receives a write command relating to the data present in the primary logical volume (for example "DATA 1") 230 from the host computer 180, then the update of the object data present in the primary logical volume ("DATA 1") 230 and saving the journal in the journal logical volume ("JNL 1") 230 are conducted by the command reception processing 210 and read-write processing 220 (arrow 270).

(2) The auxiliary storage system 100B sends a command for reading the journal into the primary storage system 100A by the journal read processing 240. If the primary storage system 100A receives the command for reading the journal from the auxiliary storage system 100B, the journal is read from the journal logical volume ("JNL 1") 230 and transmitted to the auxiliary storage system 100B by the command reception processing 210 and read-write processing 220 (arrow 280).

(3) The auxiliary storage system 100B stores the journal read out from the primary storage system into the journal logical volume ("JNL 2") 230 by the read-write processing 220 (arrow 280).

(4) The auxiliary storage system 100B reads the journal from the journal logical volume ("JNL 2") 230 in the order of increasing update numbers and updates the data of the auxiliary logical volume (for example "COPY 1") 230 by the restore processing 250 and read-write processing 220 by using the pointer information 700 (arrow 290).

FIG. 5 illustrates a specific example of volume information 400.

The volume information 400 is saved in a memory referable from the channel adapter 110 and disk adapter 120, for example, in the shared memory 140 shown in FIG. 1. The volume information 400 is employed for managing the logical volumes. As shown in FIG. 5, a volume state, a format system, a capacity, a pair number, and a physical address are stored for each logical volume number. The volume state is stored as "normal", "main", "auxiliary", "abnormal", "unused". The logical volume 230 with a "normal" or "main" volume state is a logical volume 230 that can be normally accessed from host computer 180. The logical volume 230 with an "auxiliary" volume state may be allowed to be accessed from the host computer 180. The logical volume 230 with a "main" volume state is a primary logical volume 230 for which data copying is conducted. The logical volume 230 with an "auxiliary" volume state is the auxiliary logical volume 230 which is used for copying. The logical volume 230 with an "abnormal" volume state is the logical volume 230 which cannot be normally accessed due to a failure. Here, the failure is, for example, a breakdown of the storage unit 150 storing the logical volume 230. The logical volume 230 with the "unused" volume state is a logical volume 230 which is not used. The pair number stores a pair number which is effective in the case of the "main" or "auxiliary" volume state and serves to specify the below-described pair information 500. In the example shown in FIG. 5, the logical volume of the logical volume number "1" is a primary logical volume storing the data which is the object of copying, can be accessed, has a format system of "OPEN 3" and a capacity of "3 GB", and indicates that the data held therein are stored from the head of the storage area of the physical storage unit 150 with a storage unit number "1".

A specific example of pair information 500 is shown in FIG. 6.

The pair information 500 is saved in a memory referable from the channel adapter 110 and disk adapter 120, for example, in the shared memory 140 shown in FIG. 1. The pair information 500 is the information for managing the pairs and, as shown in FIG. 6, a pair state, a primary storage system number, a primary logical volume number, an auxiliary storage system number, an auxiliary logical volume number, a group number, and a copy completion address are held for each pair number. The pair state holds any of "normal", "abnormal", "unused", "yet to be copied", "being copied". When the pair state is "normal", it indicates that data copying of the primary logical volume 230 is conducted normally. When the pair state is "abnormal", it indicates, that copying of the primary logical volume 230 is not conducted due to a failure. The failure as referred to herein is, for example, a breakage of the connection path 200. When the pair state is "unused", it indicates that the information with this pair number is ineffective. When the pair state is "being copied", it indicates that the below-described initial copy processing is being conducted. When the pair state is "yet to be copied", it indicates that the below-described initial copy processing has not yet been conducted. The primary storage system number holds the number specifying the primary storage system 100A holding the primary logical volume 230. The auxiliary storage system number holds the number specifying the auxiliary storage system 100B holding the auxiliary logical volume 230. The group number holds the number of the group to which the primary logical volume belongs in the case of the primary storage system 100A and holds the number of the group to which the auxiliary logical volume belongs in the case of the auxiliary storage system 100B. The copy completion address is explained in the below described initial copy processing. In the pair information 1 shown as an example in FIG. 6, the data copying object is a primary logical volume specified by the primary logical volume number "1" of the primary storage system number "1", the data copying address is an auxiliary logical volume specified by the auxiliary logical volume number "1" of the auxiliary storage system number "2", and this pair information indicates that data copying processing is conducted normally.

FIG. 7 shows a specific example of group information 600.

The group information 600 is retained in a memory referable from the channel adapter 110 and disk adapter 120, for example, in a shared memory 140. As shown in FIG. 7, the group information 600 holds a group state, a pair set, a journal logical volume number, and an update number. The group state holds any of "normal", abnormal", and "unused". When the group state is "normal", it indicates that at least one pair state of a pair set is "normal". When the group state is "abnormal", it indicates that all the pair states of the pair set are "abnormal". When the group state is "unused", it indicates that the information on the group number is ineffective. The pair set holds the pair numbers of all the primary logical volumes belonging to this group in the case of the primary storage system, and holds the pair numbers of all the auxiliary logical volumes belonging to this group in the case of the auxiliary storage system. The journal logical volume number indicates the number of the journal logical volumes belonging to the group with this group number. The update number has an initial value of 1 and is incremented by +1 if data is written into the primary logical volume in the group. The update number is stored in the update information of the journal and is used to protect the update sequence of data in the auxiliary storage system 100B. Even at the zero stage, as shown in FIG. 7, in the group information 600, the group with a group number "1" is composed of a logical volume belonging to the pair numbers "1" and "2" and a journal logical volume 4 with a logical volume number "4", and the data copying processing is conducted normally.

Figure 9:
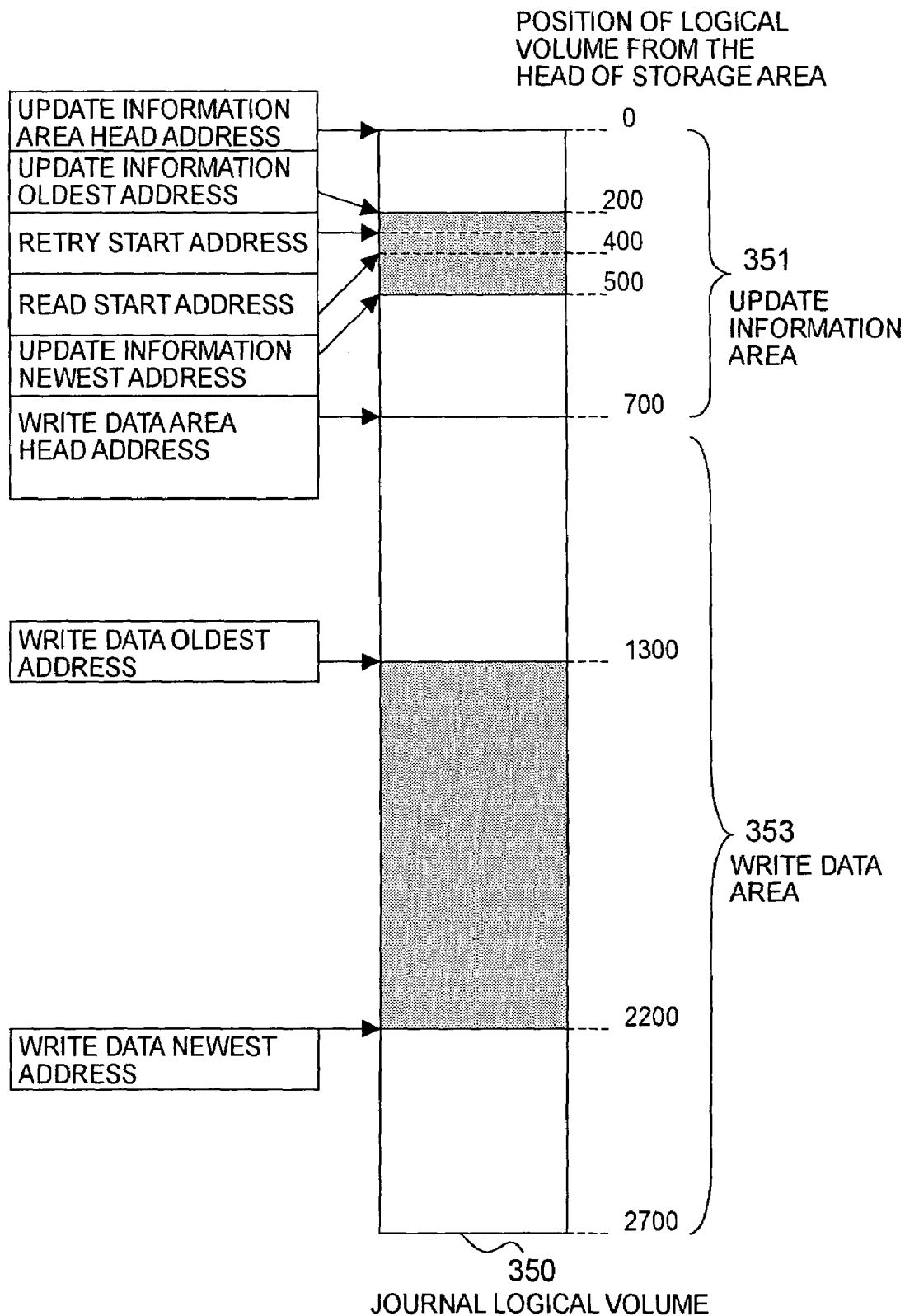
FIG. 9 illustrates the relation between the items in the pointer information and the journal logical volume.

FIG. 8 illustrates a specific example of pointer information 700. FIG. 9 explains the relation between the items contained in the pointer information and the journal logical volume 350.

The pointer information 700 is retained in the memory referable from the channel adapter 110 and disk adapter 120, for example, in the shared memory 140. The pointer information 700 is the information for managing the journal logical volume of the group for each group. As shown in FIG. 8, the pointer information holds an update information area head address in the journal logical volume, a write data area head address, an update information newest address, an update information oldest address, a write data newest address, a write data oldest address, read start address, and a retry start address.

The primary storage system 100A has the pointer information 700 for managing the journal logical volume in the primary storage system 100A, the number of the pointer information sets being equal to the number of auxiliary storage systems connected to the primary storage system 100A. Thus, in the example shown in FIG. 2, one auxiliary storage system 100B is connected to the primary storage system 100A. Therefore, as shown in FIG. 8, the primary storage system 100A has one set of pointer information 700 correspondingly to this one auxiliary storage system 100B. The system number of this one auxiliary storage system 100B is described in the pointer information 700. However, in the below-described example shown in FIG. 25, a plurality (for example, two) of auxiliary storage systems 100B, 100C are connected in parallel to the primary storage system 100A. In the case shown in FIG. 25, the primary storage system 100A has a plurality of sets of pointer information 700B, 700C (see FIG. 26), each corresponding to the respective system of the aforesaid plurality of auxiliary storage systems 100B, 100C, and the system numbers of the corresponding auxiliary storage systems 100B, 100C are recorded in the plurality of sets of pointer information 700B, 700C. Thus, when the primary storage system 100A has a plurality of sets of pointer information 700 corresponding to each of a plurality of auxiliary storage systems 100B, 100C connected to the primary storage system, whether or not the journal read from the primary storage system 100A has been conducted by the respective auxiliary storage systems 100B, 100C (the timing thereof differs between the auxiliary storage systems 100B, 100C) can be managed by a plurality of sets of pointer information 700 allocated to respective auxiliary storage systems 100B, 100C. Using this makes it possible to conduct control so that the primary storage system 100A holds each journal located in the primary storage system 100A so that it is not deleted till it is read by all of the plurality of auxiliary storage systems 100B, 100C.

On the other hand, the auxiliary storage system 100B basically has one set of pointer information 700 for managing the journal logical volume in this auxiliary storage system 100B. However a configuration in which a plurality of auxiliary storage systems are cascade connected to the primary storage system can be also used (this configuration is not shown in the figures). In this case, the auxiliary storage system positioned in the middle of the cascade can have a plurality of sets of pointer information corresponding to the two, upper and lower, auxiliary storage systems.

As shown in FIG. 9, the update information area head address holds the logical address of the head of the update information area 351 of the journal logical volume 350. The write data area head address holds the logical address of the head of the write data area 353 of the journal logical volume 350. The update information newest address holds the logical address of the head used for retaining the update information of a journal when the journal is stored next. The update information oldest address holds the logical address of the head retaining the update information of the oldest (with the smallest update number) journal. The write data newest address holds the logical address of the head used for retaining the write data when the journal is stored next. The write data oldest address holds the logical address of the head retaining the write data of the oldest (with the smallest update number) journal in the journal logical volume 350. The read start address and retry start address are used only in the primary storage system 100A and are employed in the below-described journal read reception processing. In the pointer information 700 shown as an example in FIG. 8, the update information area 351 is from the head (address "0") of the storage area with the logical volume number "4" to the position with the address "699", and the write data area 353 is from the position with the address "700" in the storage area with the logical volume number "4" to the address "2699". Further, the update information is retained from the position with the address "200" of the storage area with the logical volume number "4" to the position with the address "499", and the update information of the next journal is stored from the position with the address "500" of the storage area with the logical volume number "4". Furthermore, the write data of the journal is retained from the position with the address "1300" of the storage area with the logical volume number "4" to the position with the address "2199", and the write data of the next journal is stored from the position with the address "2200" of the storage area with the logical volume number "4".

In the explanation provided above, one journal logical volume was allocated to one group. However, a plurality of journal logical volumes may be allocated to one group. For example, two journal logical volumes may be allocated to one group, the pointer information 700 may be provided for each journal logical volume, and the journal may be stored alternately in the two journal logical volumes. As a result, the writing of the journal into the physical storage unit 150 is dispersed and the performance is improved. Further, journal read performance is also improved. In another example, two journal logical volumes are allocated to one group and usually only one journal logical volume is used. The other journal logical volume is used when the performance of the journal logical volume that has been presently used is decreased. The decrease in performance is referred to herein is, for example, a breakdown of one of a plurality of physical storage units 150 when the journal logical volume is composed of a plurality of physical storage units 150 and data are held based on a RAID 5 system.

As described hereinabove, the volume information 400, pair information 500, group information 600, and pointer information 700 can be stored in the shared memory 140. However, those types of information 400, 500, 600, and 700 may be also stored collectively in any of the cache memory 130, channel adapter 110, disk adapter 120, of physical storage unit 150 or may be dispersed therebetween.

Figure 10:
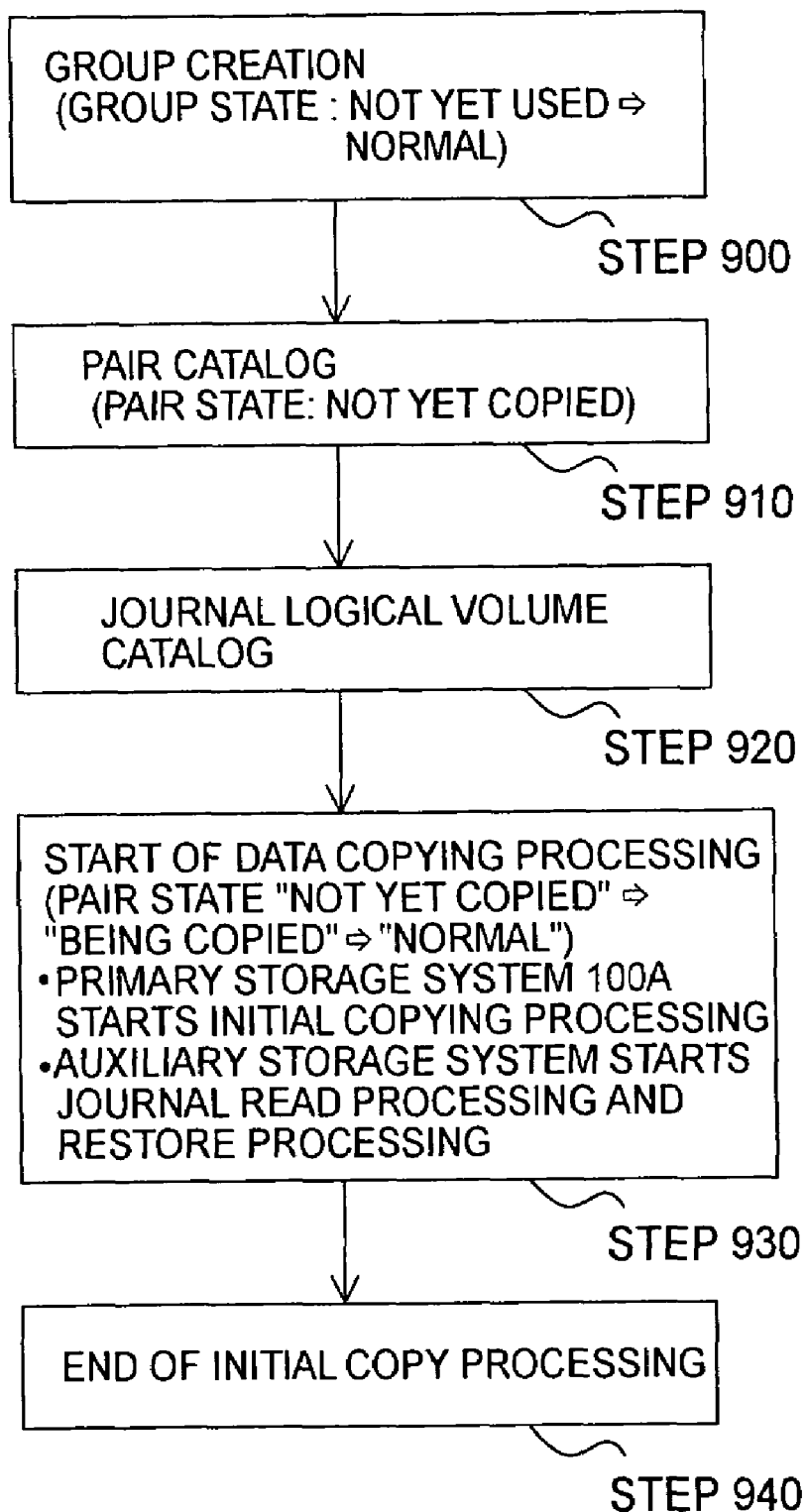
FIG. 10 is a flow chart illustrating the procedure of starting data copying of the first embodiment.

FIG. 10 is a flow chart illustrating the procedure of starting data copying in the present embodiment. The procedure of staring data copying will be explained below with reference to FIG. 10 with respect to copying from the primary storage system 100A to the auxiliary storage system 100B.

(1) Group Creation (Step 900)

The user acquires the group number with an "unused" group state, for example, the group number "A" by using the maintenance terminal or host computer 180 with reference to the group information 600 in the primary storage system 100A. The user inputs the group creation designation that designates the group number "A" into the primary storage system 100A by using the maintenance terminal or host computer 180. Having received the group creation designation, the primary storage system 100A changes the group state of the designated group number "A" to "normal".

Similarly, the user acquires the group number with an "unused" group state, for example, the group number "B" with reference to the group information 600 of the auxiliary storage system 100B. The user inputs the group creation designation that designates the auxiliary storage system 100B and the group number "B" into the primary storage system 100A by using the maintenance terminal or host computer 180. The primary storage system 100A transfers the received group creation designation to the auxiliary storage system 100B. The auxiliary storage system 100B changes the group state of the designated group number "B" to "normal".

Alternatively, the user may directly input the group creation designation that designates the group number "B" into the auxiliary storage system 100B by using the maintenance terminal of the auxiliary storage system 100B or the host computer 180 connected to the auxiliary storage system 100B. In this case, too, the auxiliary storage system 100B changes the group state of the designated group number "B" to "normal".

(2) Pair Catalog (Step 910)

The user inputs into the primary storage system 100A the pair catalog designation which designates the information specifying the primary logical volume which is the data copying source and the information which specifies the auxiliary logical volume which is the data copying address by using the maintenance terminal or host computer 180. The information specifying the primary logical volume includes the created group number "A" and the primary logical volume number in this group "A". The information specifying the auxiliary logical volume includes the storage system number of the auxiliary storage system 100B, the created group number "B", and the auxiliary logical volume number in this group "B".

Having received the aforesaid pair catalog designation, the primary storage system 100A acquires the pair number with the "unused" pair information from the pair information 500. Then, the primary storage system 100A, in the row of the acquired pair numbers in the pair information 500, sets the pair state to "yet to be copied", sets the storage system number of the primary storage system 100A to the primary storage system number, sets the designated primary logical volume number to the primary logical volume number, sets the designated ass number to the ass number, sets the designated auxiliary logical volume number to the auxiliary logical volume number, and sets the designated group number "A" to the group number. Furthermore, the primary storage system 100A adds the acquired pair number to the pair set of the group information 600 with the designated group number "A" and changes the volume state with the primary logical volume number to "main".

The primary storage system 100A posts the storage system number of the primary storage system 100A, the group number "B" designated by the user, the primary logical volume number, and the auxiliary logical volume number to the auxiliary storage system 100B. The auxiliary storage system 100B acquires the pair number that has not yet been used from the pair information 500. Furthermore, the auxiliary storage system 100B, in the row of the acquired pair numbers in the pair information 500, sets the pair state to "yet to be copied", sets the storage system number of the primary storage system 100A to the mss number, sets the designated primary logical volume number to the primary logical volume number, sets the designated auxiliary storage system number of the auxiliary storage system 100B to the ass number, sets the designated auxiliary logical volume number to the auxiliary logical volume number, and sets the designated group number "B" to the group number. Furthermore, the auxiliary storage system 100B adds the acquired pair number to the pair set of the group information 600 with the designated group number "B" and changes the volume state with the auxiliary logical volume number to "auxiliary".

The above-described operation is conducted with respect to pairs of all the data copying objects.

In the case explained hereinabove, the cataloguing of logical volumes into groups and setting the pairs of logical volumes were conducted simultaneously, but they may be also conducted independently from each other.

(3) Journal Logical Volume Catalog (Step 920)

The user inputs into the primary storage system 100A the designation (journal logical volume catalog designation) for cataloguing the logical volumes (journal logical volumes) used for retaining the journal, by using the maintenance terminal or host computer 180. The group number and logical volume number are included into the journal logical volume catalog designation.

The primary storage system 100A catalogs the designated logical volume number to journal logical volume numbers present in the group information 600 with the designated group number and then sets "normal" in the volume state in the volume information 400 of the logical volume.

At the same time, the user designates the storage system number of the auxiliary storage system 100B, the group number "B", and the logical volume number of the journal logical volume by referring to the volume information 400 of the auxiliary storage system 100B and using the maintenance terminal or host computer 180 and inputs the designation of the journal logical volume catalog into the primary storage system 100A. The primary storage system 100A transfers the journal logical volume catalog designation to the auxiliary storage system 100B. The auxiliary storage system 100B catalogs the designated logical volume number into the journal logical volume number in the group information 600 with the designated group number "B" and then sets "normal" in the volume state in the volume information 400 of the logical volume.

The user may also designate the group number and the logical volume number of the journal logical volume by using the maintenance terminal of the auxiliary storage system 100B or the host computer 180 connected to the auxiliary storage system 100B and to input the journal logical volume catalog designation directly into the auxiliary storage system 100B. In this case, too, the auxiliary storage system 100B catalogs the designated logical volume number in the logical volume number in the group information 600 with the designated group number "B" and then sets "normal" in the volume state in the volume information 400 of the logical volume.

The above-described operation is conducted with respect to all the logical volumes used as the journal logical volumes. The order of step 910 and step 920 may be inversed.

(4) Start of Data Copying Processing (Step 930)

The user indicates the group number for starting the data copying processing by using the maintenance terminal or host computer 180 and designates the start of data copying processing in the primary storage system 100A. The primary storage system 100A sets to "0" the copy completion address of all the pair information 400 belonging to the designated group.

The primary storage system 100A designates the start of journal read processing 240 and restore processing 250 (see FIG. 2) to the auxiliary storage system 100B. The primary storage system 100A starts the below described initial copying processing.

(5) End of Initial Copying Processing (Step 940)

If the initial copying processing is ended, the primary storage system 100A report the end of the initial copying processing to the auxiliary storage system 100B. The auxiliary storage system 100B changes the pair states of all the auxiliary logical volumes belonging to the designated group to "normal".

Figure 11:
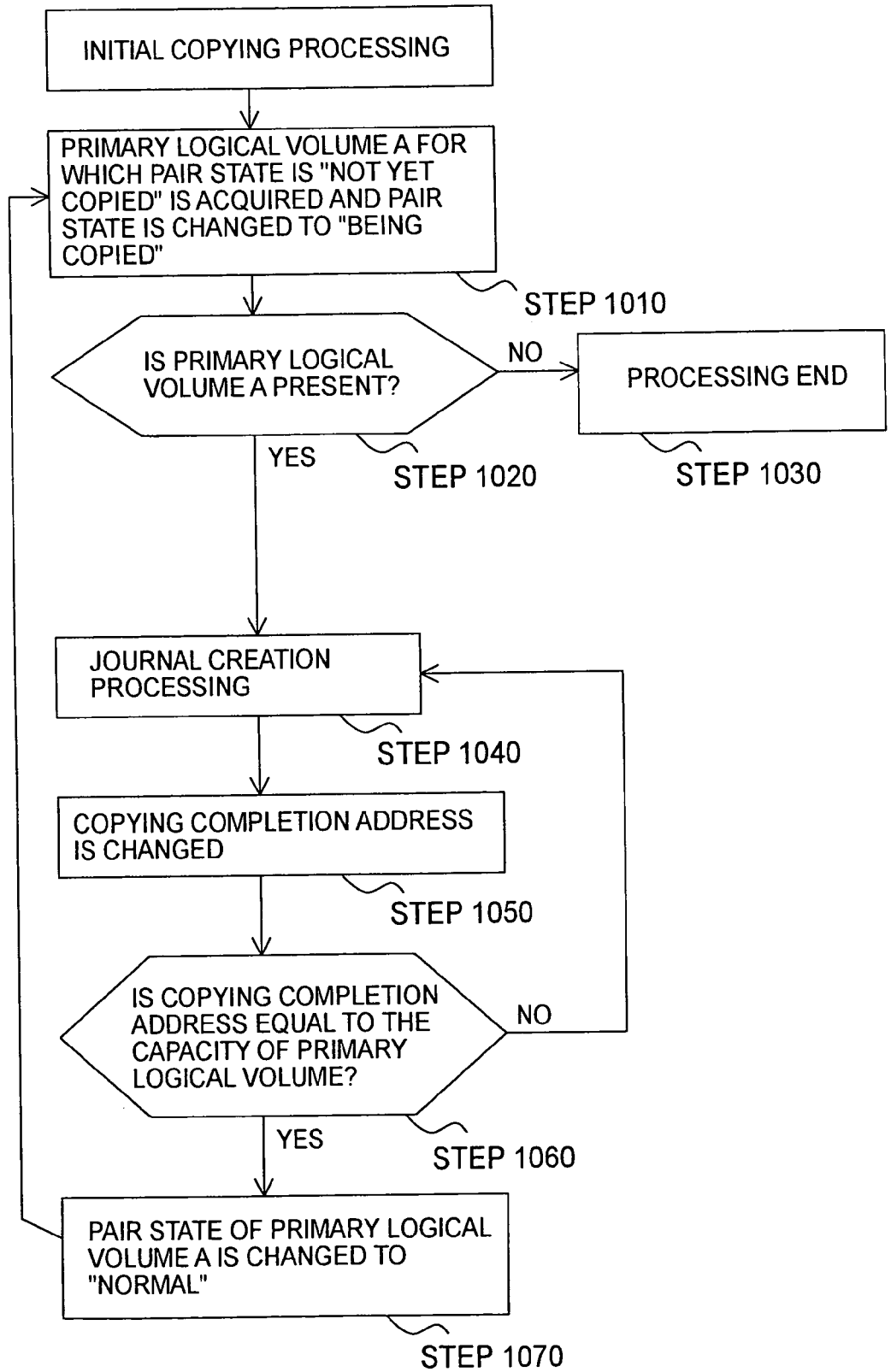
FIG. 11 is a flow chart illustrating the initial copying processing of the first embodiment.

FIG. 11 is a flow chart illustrating the initial copying processing procedure conducted in the aforesaid step 930 shown in FIG. 10.

In the initial copying processing, with respect to the entire storage area of the primary logical volume which is the object of data copying, journals are created for each unit data size in the order from the head of that entire storage area, while using the copy completion address of the pair information 500. The initial value of the copy completion address is zero and each time the journal is created, the data size of the data for which journal creation has been completed is added thereto. In the initial copying processing, journal creation is completed for the range from the head of the storage area of the logical volume to the address immediately presenting the copy completion address. Conducting initial copying processing makes it possible to transfer the data that are in the primary logical volume and have not been updated to the auxiliary logical volume. The explanation hereinbelow is conducted with respect to the case in which the channel adapter 110 (see FIG. 10) located in the primary storage system 100A conducts the initial copying processing, but the initial copying processing may be also conducted by the disk adapter 120. The procedure of the initial copying processing will be explained hereinbelow based on FIG. 11.

(1) The channel adapter 110 located in the primary storage system 100A obtains a primary logical volume, for example "A", for which the pair state is "not yet copied" among the pairs belonging to the group which is the processing object, changes this pair state to "being copied" and repeats the below-descried processing (steps 1010, 1020). When the primary logical volume with a "not yet copied" pair state is not present, the processing is ended (step 1030).

(2) The channel adapter 110 creates a journal for each data of a unit size (for example, 1 MB) with respect to the primary logical volume "A" acquired in step 1010 (step 1040). The journal creation processing is described below in greater detail.

(3) The channel adapter 110 adds the size of the data for which the creation of journal has been completed to the copying completion address of pair information 500 (step 1050).

(4) The above-described processing of step 1040 and step 1050 is repeated till the copying completion address reaches the capacity of the primary logical volume "A" (step 1060). When the copying completion address becomes equal to the capacity of the primary logical volume "A", the journal becomes created for the entire storage area of the primary logical volume "A". Therefore, the channel adapter 110 updates the pair state to "normal" and the starts the initial copying processing for another primary logical volume (step 1070).

In the flow chart shown in FIG. 11, individual primary logical volumes are successively processed, but a plurality of logical volumes may be also processed simultaneously.

Figure 12:
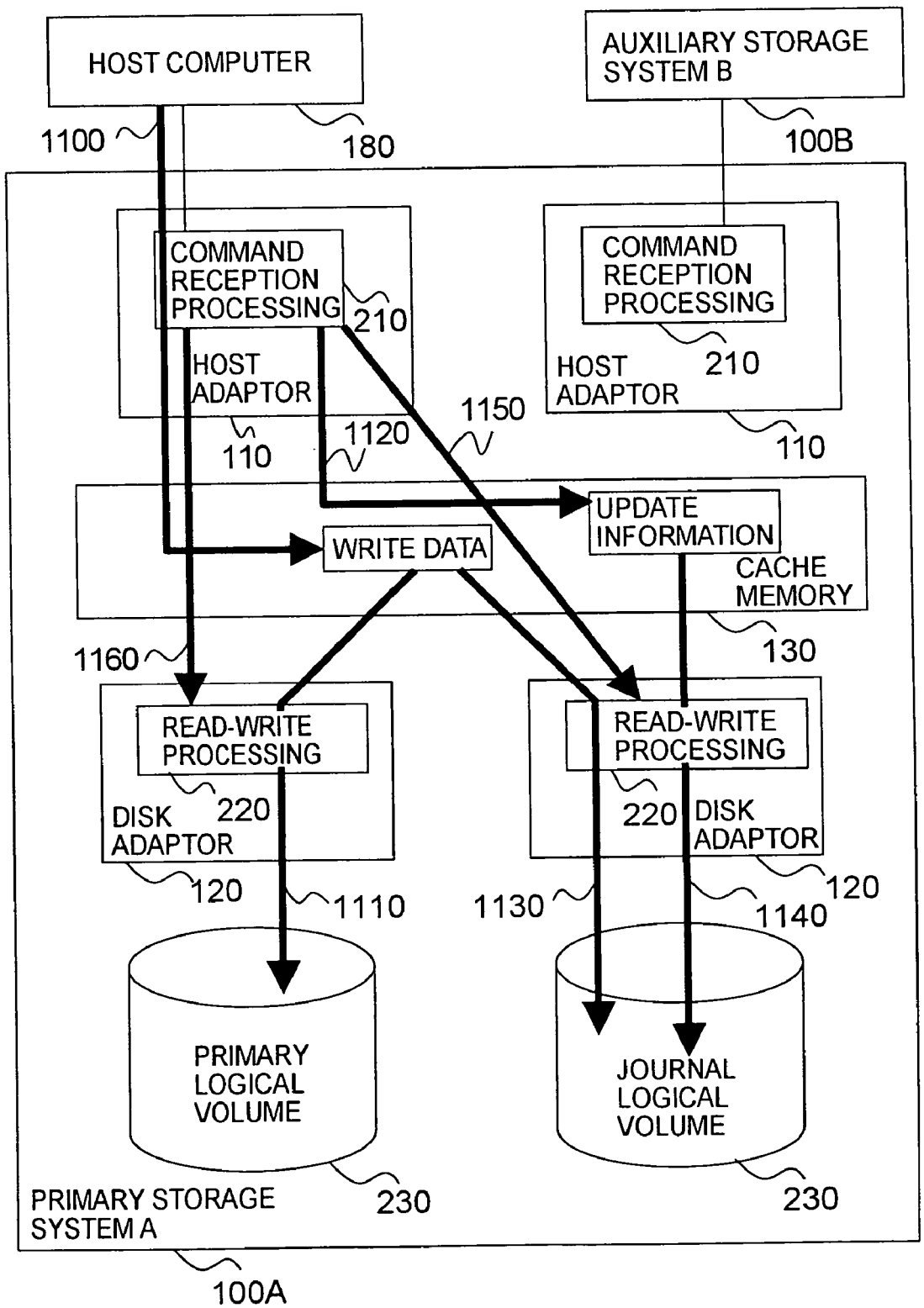
FIG. 12 illustrates a data flow in the command reception processing of the first embodiment.
Figure 13:
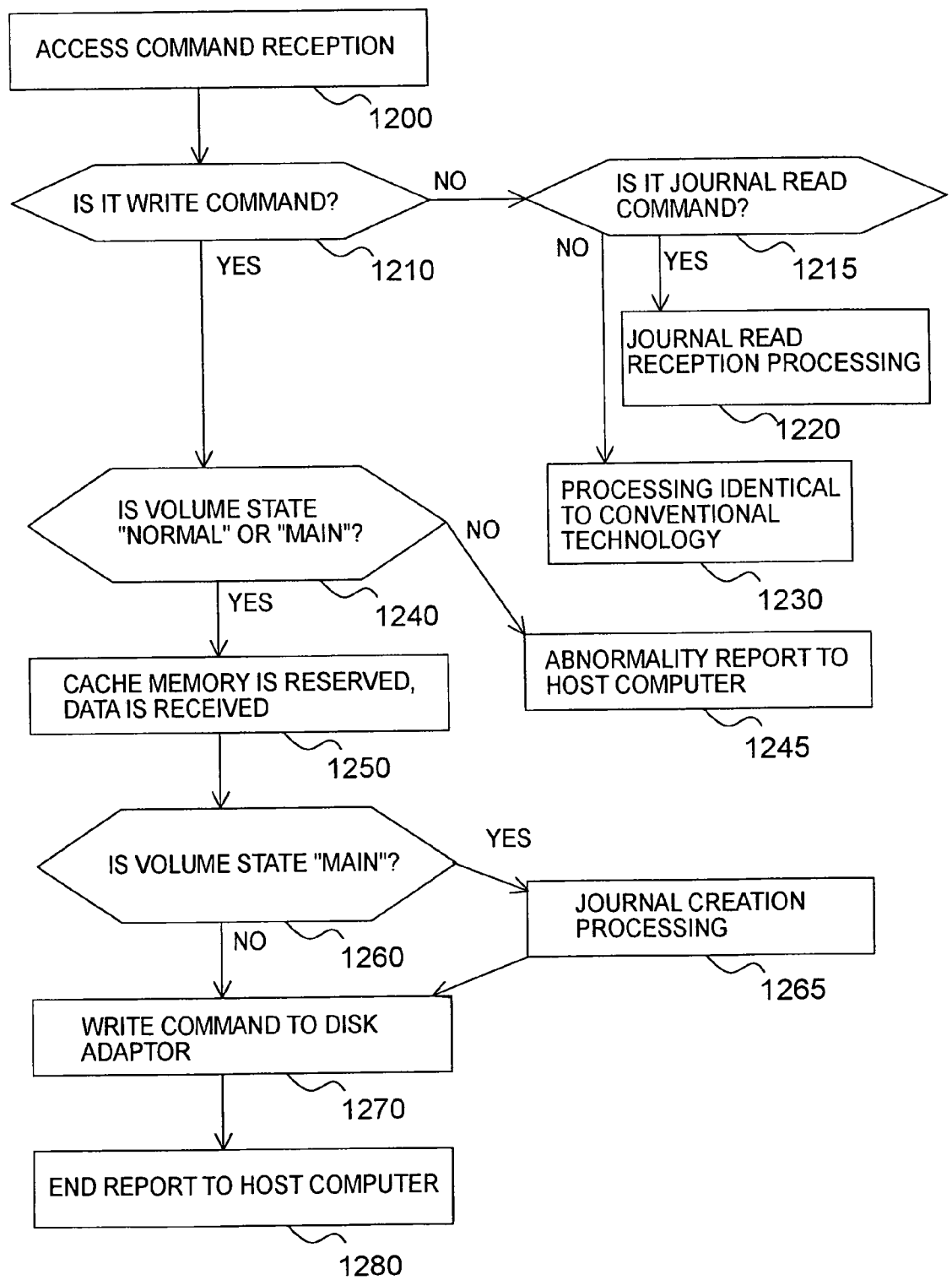
FIG. 13 is a flow chart illustrating the procedure of command reception processing of the first embodiment.
Figure 14:
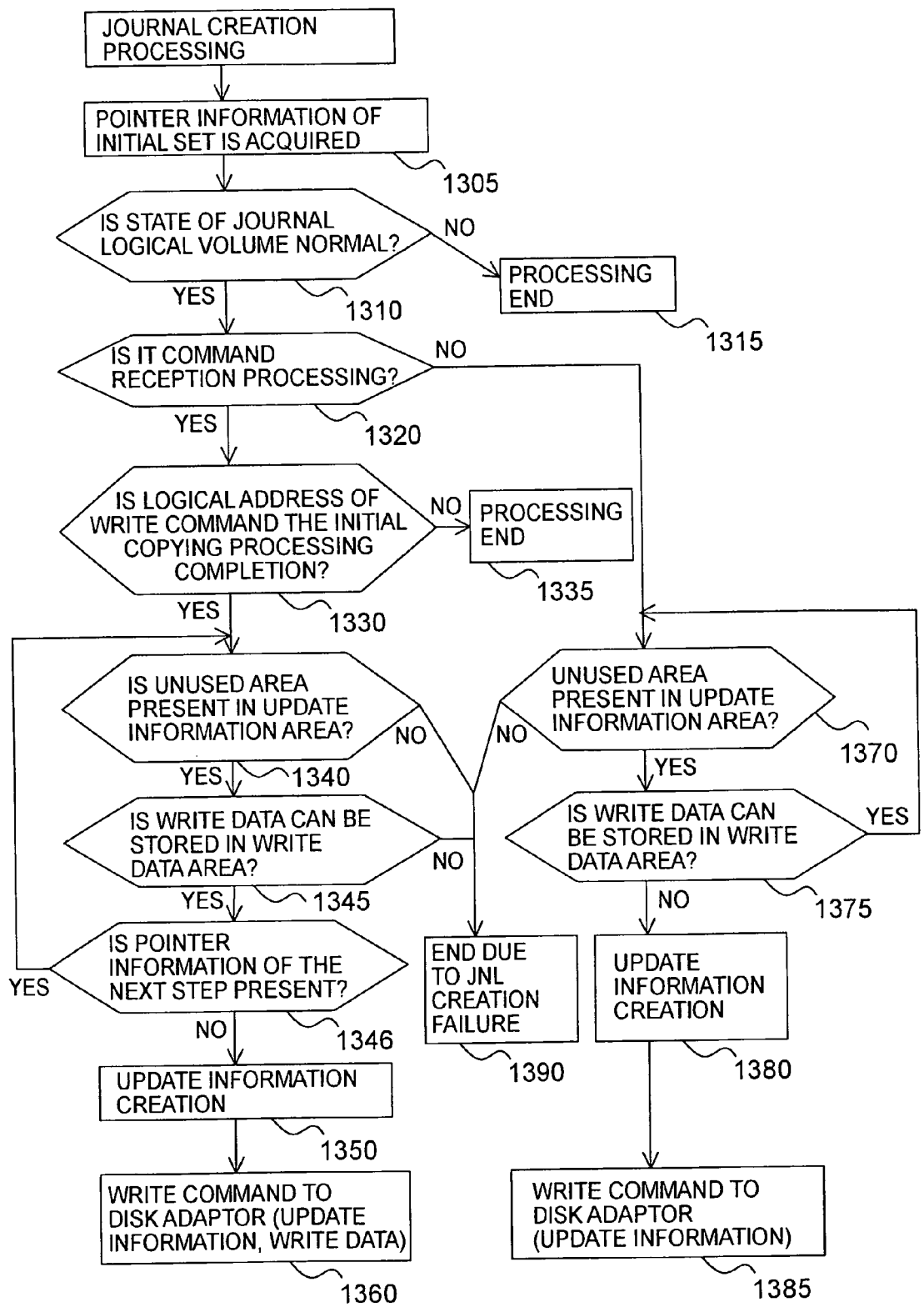
FIG. 14 is a flow chart illustrating the procedure of journal creation processing of the first embodiment.

FIG. 12 illustrates the flow of data in the command reception processing 210 (see FIG. 2). FIG. 13 is a flow chart illustrating the procedure of command reception processing 210. FIG. 14 is a flow chart of journal creation processing. The operation relating to the case in which the primary storage system 100A receives a command for the host computer 180 to write into the logical volume 230 which is the object of data copying will be described below with reference to FIGS. 12 through 14.

The entire operation of the command reception processing 210 will be explained with reference to FIG. 12 and FIG. 13.

(1) The channel adapter 110 (step 1200 shown in FIG. 13) present in the primary storage system 100A receives an access command from the host computer. The access command comprises commands such as data read, data write, or the below-described journal read, the logical address of the command object, and the data quantity. In the explanation below, the logical address in the access command will be represented as a logical address "A", the logical volume number will be represented as a logical volume "A", the position in the logical volume will be represented as a position "A" in the logical volume, and the data quantity will be represented as a data quantity "A".

(2) The channel adapter 110 examines the access command (steps 1210, 1215). When the examination conducted in step 1215 shows that the access command is a journal read command, the below-described journal read reception processing is conducted (step 1220). When the access command is other than the journal read command and data write command, for example, when it is a data read command, then data read processing is conducted in the same manner as with the conventional technology (step 1230).

(3) When the examination conducted in step 1210 shows that the access command is a data write command, the channel adapter 110 examines the volume state by referring to the volume information 400 of the logical volume A (step 1240). When the examination conducted in step 1240 shows that the volume state of the logical volume A is other than "normal" or "main", the access to the logical volume A is impossible. Therefore, the channel adapter 110 reports the abnormal end to the host computer 180 (step 1245).

(4) When the examination conducted in step 1240 shows that the volume state of the logical volume A is either "normal" or "main", the channel adapter 110 reserves the cache memory 130 and notifies the host computer 180 that the preparation for data reception has been completed. The host computer 180 receives this notification and transmits the write data to the primary storage system 100A. The channel adapter 110 receives the write data and retains it in the cache memory 130 (step 1250; 1100 in FIG. 12).

(5) The channel adapter 110 examines as to whether the logical volume "A" is the data copying object by referring the volume state of the logical volume "A" (step 1260). If the examination conducted in step 1260 shows that the volume state is "main", the logical volume "A" is the data copying object. Therefore, the below-described journal creation processing is conducted (step 1265).

(6) If the examination conducted in step 1260 shows that the volume state is "normal" or after the end of the journal creation procedure of step 1265, the channel adapter 110 instructs the disk adapter 120 to write the write data into the storage unit 150 (1140 in FIG. 12), and sends an end report to the host computer 180 (steps 1270, 1280). The disk adapter 120 then saves the write data in the physical storage unit 150 by read-write processing (1110 in FIG. 12).

The above-described journal creation processing of step 1040 shown in FIG. 11 and step 1265 shown in FIG. 13 will be described below with reference to FIG. 12 and FIG. 14.

(1) The channel adapter 110 acquires the pointer information 700 of the initial set (step 1305 in FIG. 14). The channel adapter 110 examines the volume state of the journal logical volume (step 1310). When the examination of step 1310 shows that the volume state of the journal logical volume is "abnormal", journal storage is impossible in the journal logical volume. Therefore, the channel adapter 110 changes the groups state to "abnormal" and completes the processing (step 1315). In this case the channel adapter 110 changes the journal logical volume to the normal logical volume.

(2) When the examination of step 1310 shows that the journal logical volume is normal, the channel adapter 110 continues the journal creation processing. The operations differ depending on whether journal creation processing is a processing within the initial copying processing or a processing within the command reception processing (step 1320). When the journal creation processing is a processing within the command reception processing, the operations are conducted from step 1330. When the journal creation processing is within the initial copying processing, the operations are conducted from step 1370.

(3) When the journal creation processing is a processing within the command reception processing, the channel adapter 110 examines as to whether the logical address "A" of the write object is the processing object of the initial copying processing (step 1330). When the pair state of the logical volume "A" is "not yet copied", the journal creation processing is conducted thereafter in the initial copying processing. Therefore, the channel adapter 110 ends processing, without creating the journal (step 1335). When the pair state of the logical volume "A" is "being copied", if the copying completion address is equal to or less than the position "A" in the logical address, the journal creation processing is conducted thereafter in the initial copying processing. Therefore, the channel adapter 110 ends processing, without creating the journal (step 1335). In other cases, that is, when the pair state of the logical volume "A" is "being copied" and the copying completion address is not less than the position "A" in the logical address, or when the pair state of the logical volume "A" is "normal", the channel adapter 110 continues the journal creation processing.

(4) The channel adapter 110 then examines as to whether the journal can be stored in the journal logical volume. Thus, the channel adapter 110 uses the pointer information 700 and examines the presence of an unused area of the update information area (step 1340). When the update information newest address and the update information oldest address of pointer information 700 are equal to each other, no unused area is present in the update information area. Therefore, the channel adapter 110 ends processing as a journal creation failure (step 1390).

When the examination of step 1340 shows that an unused area is present in the updated information area, the channel adapter 110 uses the pointer information 700 and examines as to whether a write data can be stored in the write data area (step 1345). When the sum of the write data newest address and data quantity "A" is equal to or larger than the write data oldest address, storing in the write data area is impossible. Therefore, the channel adapter 110 ends processing as a journal creation failure (step 1390). The channel adapter 110 repeats the processing of steps 1340 through 1345 with respect to the pointer information 700 of the next set as long as the pointer information 700 of the next set is present.

(5) When the journal can be stored, the channel adapter 110 acquires an update number, a logical address for storing the update information, and a logical address for storing the write data and creates the update information in the cache memory 130. The channel adapter 110 acquires the update number from the group information 600 of the object group, adds 1 thereto, and sets the resulting numerical value in the update number of group information 600. The channel adapter 110 acquires the update information newest address of pointer information 700 as the logical address for storing the update information, adds the size of the update information thereto, and sets the resulting numerical value in the update information newest address of pointer information 700. The channel adapter 110 acquires the write data newest address of pointer information 700 as the logical address for storing the write data, adds the data quantity "A" to this write data newest address, and sets the resulting numerical value in the write data newest address of pointer information 700. The channel adapter 110 sets the above-described acquired numerical value, group number, write command reception time, logical address "A" in the write command, and data quantity "A" into the update information (step 1350; 1120 in FIG. 12). For example, when the group information 600 shown as an example in FIG. 7 and the pointer information 700 shown as an example in FIG. 8 are present, if a write command is received which instructs that the data of data size "100" be written in a position advanced by an address number "800" from the head of the storage area of the primary logical volume "1" that belongs to group "1", the channel adapter 110 creates the update information such as shown in FIG. 15. Further, the update number in the group information 600 shown as an example in FIG. 7 is changed to "5". Moreover, the update information newest address in the pointer information 700 is changed to "600" (when the size of the update information was "100") and the write data newest address is changed to "2300". When there is the pointer information 700 of a plurality of sets corresponding to a respective plurality of auxiliary storage systems connected to the primary storage system, the channel adapter 110 updates the entire pointer information 700 of that plurality of sets in the above-described manner.

(6) The channel adapter 110 instructs the disk adapter 120 to write the write data and update information of the journal into the storage unit 150 and normally ends the processing (step 1360; 1130, 1140, 1150 in FIG. 12).

(7) When the journal creation processing is a processing within the initial copying processing, the operations are conducted from step 1370. The channel adapter 110 examines as to whether the journal can be created. Thus, the channel adapter 110 uses the pointer information 700 and examines the presence of an unused area in the update information area (step 1370). When the update information newest address and the update information oldest address of pointer information 700 are equal to each other, no unused area is present in the update information area. Therefore, the channel adapter 110 ends processing as a journal creation failure (step 1390). Here, in the initial copying processing of the present embodiment, the write data of the journal is read from the primary logical volume, and the write data area is not used. Therefore, confirmation of the unused area in the write data area is not required. The channel adapter 110 repeats the processing of step 1370 with respect to the pointer information 700 of the next set as long as the pointer information 700 of the next set is present.

(8) When the examination of step 1370 shows that the journal can be stored, the channel adapter 110 acquires the following numerical values which are to be set in the update information and creates the update information in the cache memory 130. Thus, the channel adapter 110 acquires the update number for the group information 600 of the object group, adds 1 thereto, and sets the resulting numerical value in the update number of group information 600. The channel adapter 110 acquires the position of the update information newest address of pointer information 700 as the logical address for storing the update information, adds the size of the update information thereto, and sets the resulting numerical value in the update information newest address of pointer information 700.

The channel adapter 110 sets the above-described acquired numerical value, group number, start time of the present processing, logical address of the initial copying processing object, processing data quantity for one cycle of initial copying, and a logical address of the journal logical volume storing the write data in the initial copying processing into the update information (step 1380; 1120 in FIG. 12).

(9) The channel adapter 110 instructs the disk adapter 120 to write the write data and update information into the storage unit 150 and normally ends the processing (step 1385; 1140, 1150 in FIG. 12).

In the explanation above, the update information was stored in the cache memory 130, but as a modification of the aforesaid configuration, the update information may be also stored in the shared memory 140 or other storage location.

Writing of the write data with the disk adapter 120 into the physical storage unit 150 can be conducted asynchronously (that is, not necessarily immediately after step 1360 and step 1385). However, when the host computer 180 again generates a write command relating to the logical address "A", the write data of the journal are overwritten. Therefore, the write data of the journal have to be written into the storage location in the physical storage unit 150 corresponding to the logical address of the journal logical volume indicated by the update information prior to receiving the write data from the host computer 180. Alternatively, the write data of the journal may be saved in the other cache memory and written thereafter into the storage location in the physical storage unit 150 corresponding to the logical address of the journal logical volume of the update information.

In the above-described journal creation processing, the journals are saved from the cache memory to the physical storage unit 150 at the appropriate timing. As a modification example, a cache memory 130 of a constant capacity may be prepared in advance for the journals, and the journals may be saved in the physical storage unit 150 at a stage when this cache memory was entirely used. The capacity of the cache memory for the journals may be designated, for example, from the maintenance terminal.

The read-write processing 220 (see FIG. 2 and FIG. 12), is the processing in which the disk adapter 120 receives a command from the channel adapter 110 or disk adapter 120 and executes the command. The read-write processing 220 is classified into the write processing by which the data present in the designated cache memory 130 are written into the storage area in the physical storage unit 150 corresponding to the designated logical address, and the read processing by which the data of the storage area in the storage unit 150 corresponding to the designated logical address are read into the designated cache memory 130.

Figure 16:
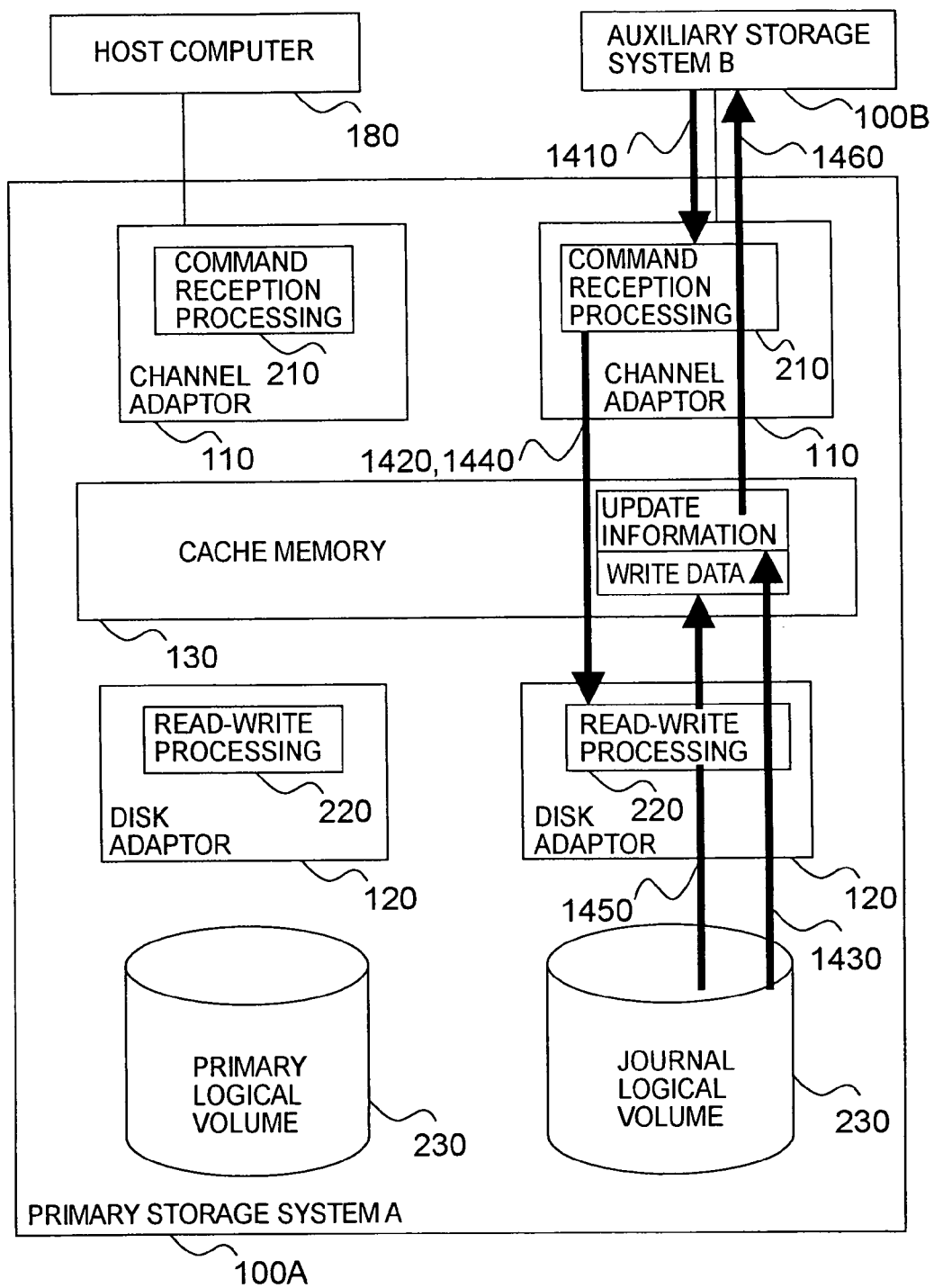
FIG. 16 illustrates a data flow in the journal read reception processing of the first embodiment.
Figure 17:
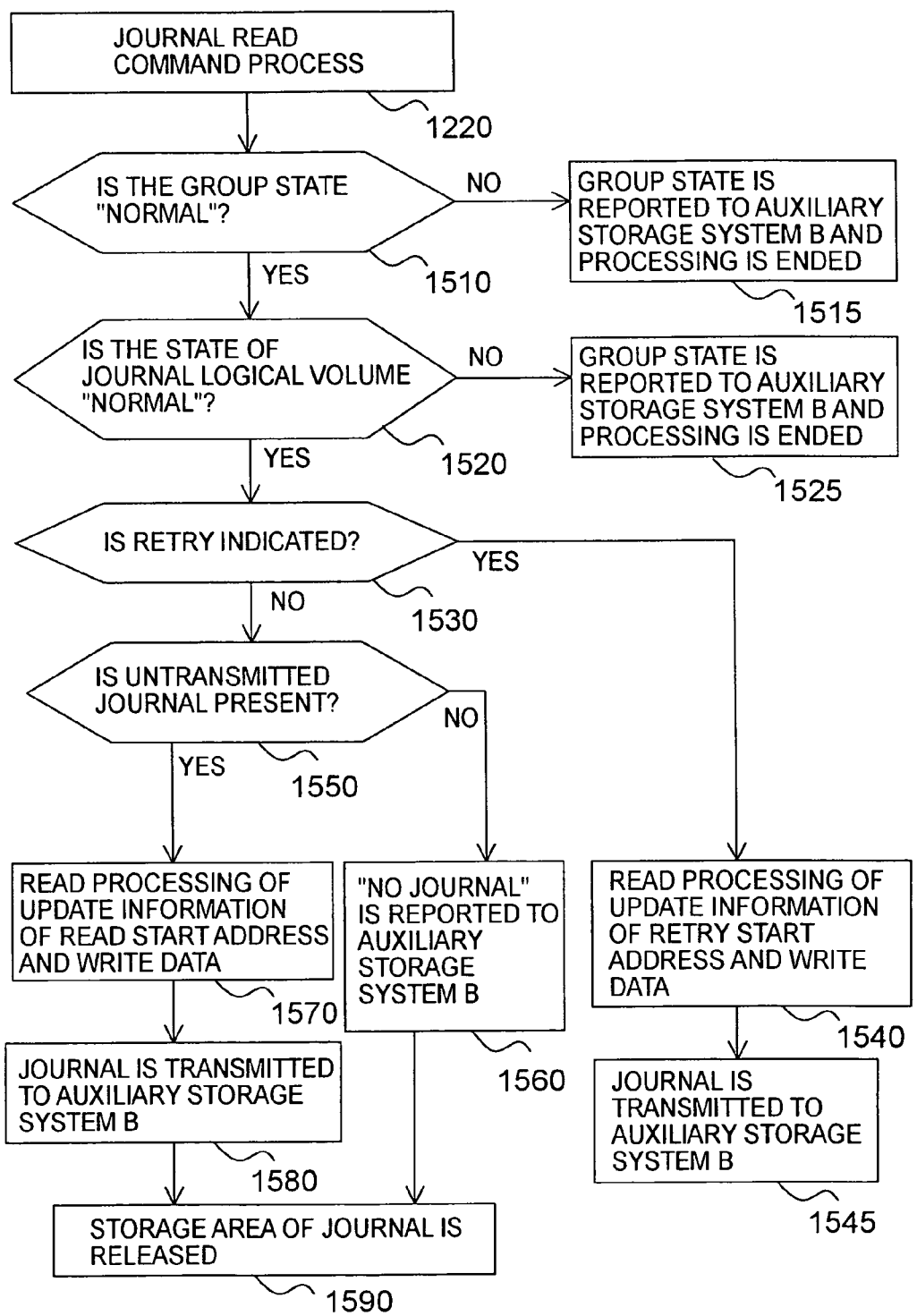
FIG. 17 is a flow chart illustrating the procedure of journal read reception processing of the first embodiment.

FIG. 16 illustrates the data flow in the operation (journal read reception processing) of the channel adapter 110 of the primary storage system 100A that has received a journal read command. FIG. 17 is a flow chart illustrating the procedure of the journal read reception processing. The operation relating to the case in which the primary storage system 100A receives a journal read command from the auxiliary storage system 100B will be described hereinbelow with reference to those drawings.

(1) As shown in FIG. 16 and FIG. 17, the channel adapter 110 present in the primary storage system 100A receives an access command (journal read command) from the auxiliary storage system 100B. This access command comprises an identifier indicating that the command is a journal read command, a group number of the command object, and the presence or absence of retry indication (step 1220; 1410 in FIG. 16). In the explanation below, the group number in the access command (journal read command) will be considered as a group number "A".

(2) The channel adapter 110 examines as to whether the group state with the group number "A" is "normal" (step 1510). If the examination of step 1510 shows that the group state is not "normal", for example, if it is "failure", the channel adapter 110 posts the group state to the auxiliary storage system 100B and ends the processing. The auxiliary storage system 100B conducts processing according to the received group state. For example, when the group state is "failure", the auxiliary storage system 100B ends the journal read processing (step 1515).

(3) If the examination of step 1510 shows that the group state with the group number "A" is "normal", the channel adapter 110 examines the state of the journal logical volume (step 1520). If the examination of step 1520 shows that the volume state of the journal logical volume is not "normal", for example, if it is "failure", the channel adapter 110 changes the group state to "failure", posts the group state to the auxiliary storage system 100B and ends the processing. The auxiliary storage system 100B conducts processing according to the received group state. For example, when the group state is "failure", the auxiliary storage system 100B ends the journal read processing (step 1525).

(4) If the examination of step 1520 shows that the volume state of the journal logical volume is "normal", the channel adapter 110 examines as to whether the journal read command is a retry indication (step 1530).

(5) If the examination of step 1530 shows that the journal read command is a retry indication, the channel adapter 110 again transmits the journal that was received in the previous cycle to the auxiliary storage system 100B. The channel adapter 110 reserves the cache memory 130 and instructs the disk adapter 120 to write the data (update information) of the size of the update information into the cache memory from the storage location indicated by the retry start address of pointer information 700 (1420 in FIG. 16).

The read-write processing 220 of the disk adapter 120 comprises reading the update information from the physical storage unit 150, saving the data in the cache memory 130, and posting the read end of the update information to the channel adapter 110 (1430 in FIG. 16).

The channel adapter 110 receives the notification about the read end of the update information, acquires the logical address of the write data and the size of the write data from the update information, reserves the cache memory 130, and instructs the disk adapter 120 to write the write data into the cache memory 130 (step 1540; 1440 in FIG. 16).

The read-write processing 220 in the disk adapter 120 comprises reading the write data from the physical storage unit 150, saving the data in the cache memory 130, and posting the read end of the write data to the channel adapter 110 (1450 in FIG. 16).

The channel adapter 110 receives the notification about the read end of the write data, transmits the update information and write data to the auxiliary storage system 100B, releases the cache memory 130 holding the journals, and ends the processing (step 1545; 1460 in FIG. 16).

(6) If the examination of step 1530 shows that the command is not the retry indication, the channel adapter 110 examines as to whether the non-transmitted journals are present and, if they are present, sends those journals to the auxiliary storage system 100B. The channel adapter 110 compares the read start address of the pointer information 700 and the update information newest address (step 1550).

When the read start address is equal to the update information newest address, all the journals have been transmitted to the auxiliary storage system 100B. Therefore, the channel adapter 110 transmits a "no journals" message to the auxiliary storage system 100B (step 1560) and releases the storage area of the journals transmitted to the auxiliary storage system 100B at the time of processing the previous journal read command (step 1590).

In the release processing of the storage area of the journals in step 1590, it is not necessary to conduct actively the release operation with respect to the storage area, and only the update of the pointer of the oldest address may be conducted. Thus, the retry start address is set into the update information oldest address of pointer information 700. When the update information oldest address becomes the write data area head address, the update information oldest address is considered to be "0". The write data oldest address of pointer information 700 is changed to a numerical value obtained by adding the size of the write data transmitted in response to the previous read journal command to the present value thereof. When the write data oldest address becomes the logical address with a capacity of not less than the journal logical volume, the write data area head address is corrected by decreasing.

(7) When the examination of step 1550 shows that un-transmitted journals are present, the channel adapter 110 reserves the cache memory 130, and instructs the disk adapter to write the data (update information) of the size of the update information from the read start address of pointer information 700 to the cache memory (1420 in FIG. 16).

The read-write processing 220 of the disk adapter 120 comprises reading the update information from the physical storage unit 150, saving it in the cache memory 130, and posting the read end of the update information to the channel adapter 110 (1430 in FIG. 16).

The channel adapter 110 receives the notification about the read end of the update information, acquires the logical address of write data and the size of write data from the update information, reserves the cache memory 130, and instructs the disk adapter 120 to read the write data into the cache memory (step 1570; 1440 in FIG. 16).

The read-write processing 220 of the disk adapter 120 comprises reading the write data from the physical storage unit 150, saving it in the cache memory 130, and posting the read end of the write data to the channel adapter (1450 in FIG. 16).

The channel adapter 110 receives the notification about the read end of the write data, transmits the update information and write data to the auxiliary storage system 100B (step 1580), and releases the cache memory 130 holding the journals (1460 in FIG. 16). Then, the read start address is set to the retry start address of the pointer information 700, and the read start address is changed to the numerical value obtained by adding the update information size of the transmitted journals to the present value.

(8) The channel adapter 110 releases the storage area of the journals that were transmitted to the auxiliary storage system 100B during processing of the previous journal read command (step 1590).

In the above-described journal read reception processing, the primary storage system 100A successively transmits the journals one by one to the auxiliary storage system 100B. In a modification example, a plurality of journals may be transmitted to the auxiliary storage system 100B at the same time. The number of journals that are transmitted by one journal read command may be designated within the journal read command by the auxiliary storage system 100B. Alternatively, the user may designate it in the primary storage system 100A or auxiliary storage system 100B at the time of group cataloguing. Furthermore, the number of journals that are transmitted in one journal read command may be changed according to the load or transfer capacity of the connection path 200 of the primary storage system 100A and the auxiliary storage system 100B. Furthermore, the journal transfer quantity may be designated according to the size of write data of the journals, rather than to the number of journals.

In the above-described journal read reception processing, the journals are read from the physical storage unit 150 into the cache memory 130. However, this operation is unnecessary when the journals are already present in the cache memory 130.

The release processing of the storage area of the journals in the above-described journal read reception processing is implemented during processing of the next journal read command. As a modification example, the storage area of the journals may be also released immediately after the journals have been transmitted to the auxiliary storage system 100B. Furthermore, the auxiliary storage system 100B also may set the update number that may be released in the journal read command, and the primary storage system 100A may release the storage area of the journals with the update numbers designated by this setting.

Figure 18:
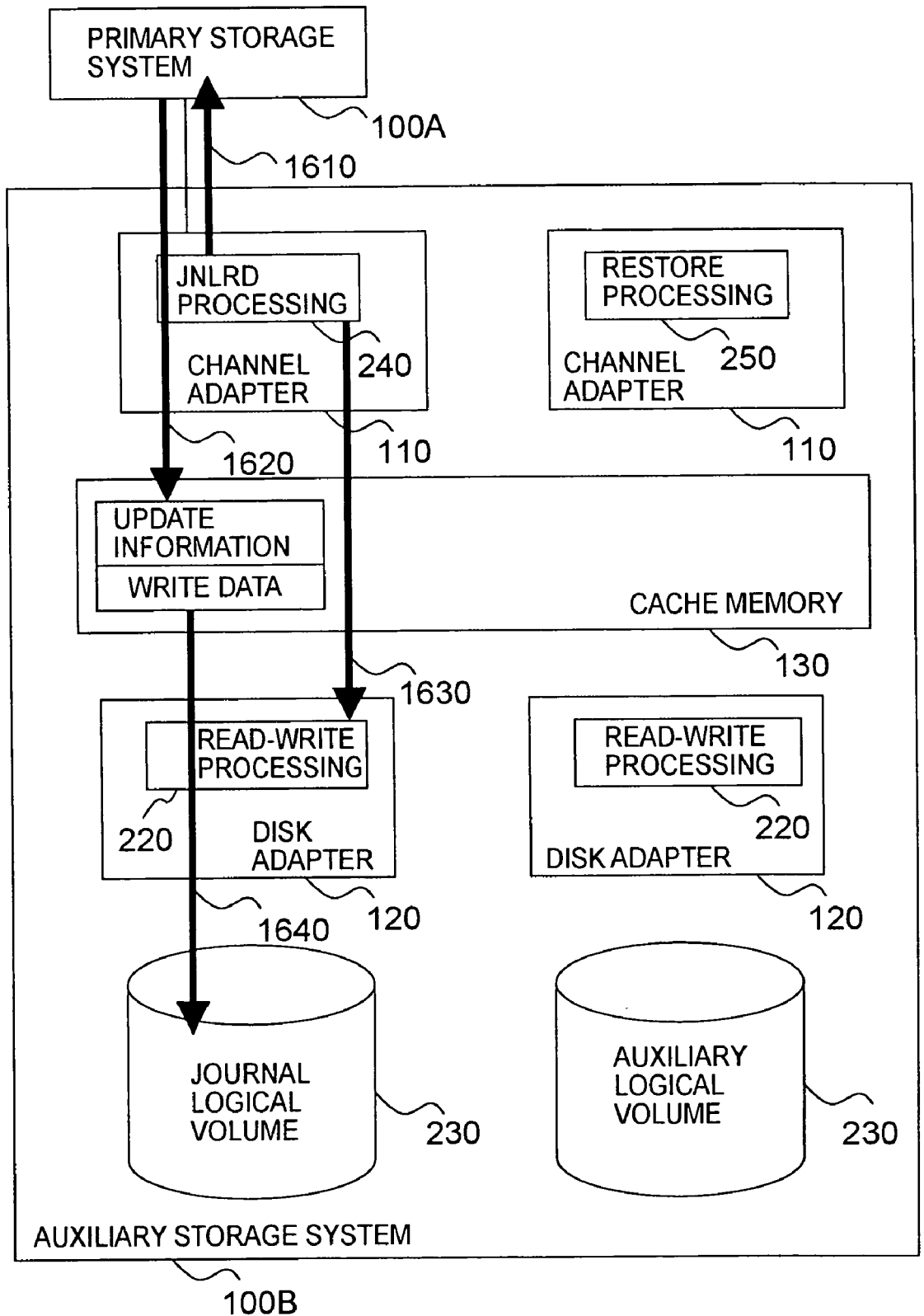
FIG. 18 illustrates a data flow in the journal read command processing of the first embodiment.
Figure 19:
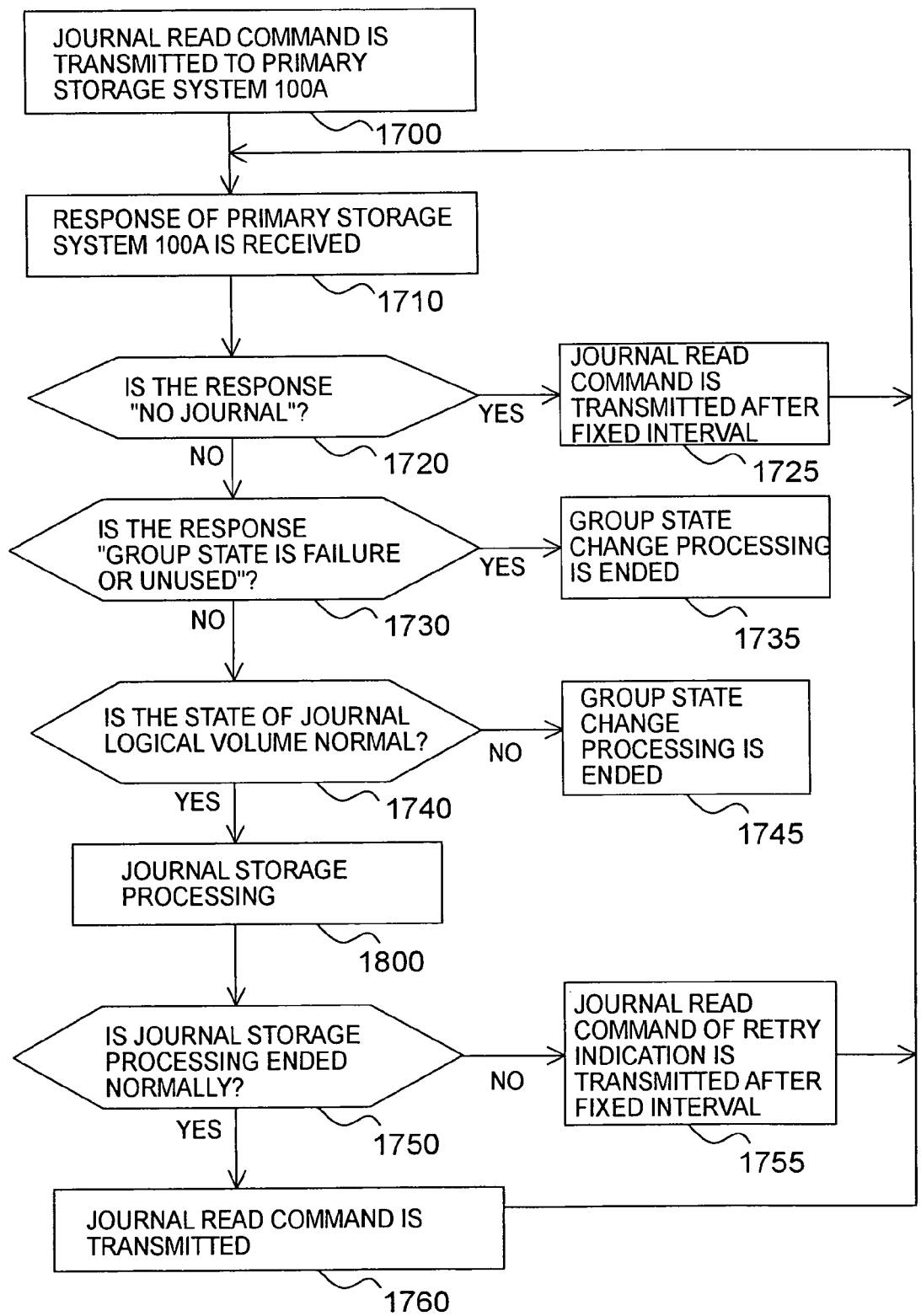
FIG. 19 is a flow chart illustrating the procedure of journal read command processing of the first embodiment.
Figure 20:
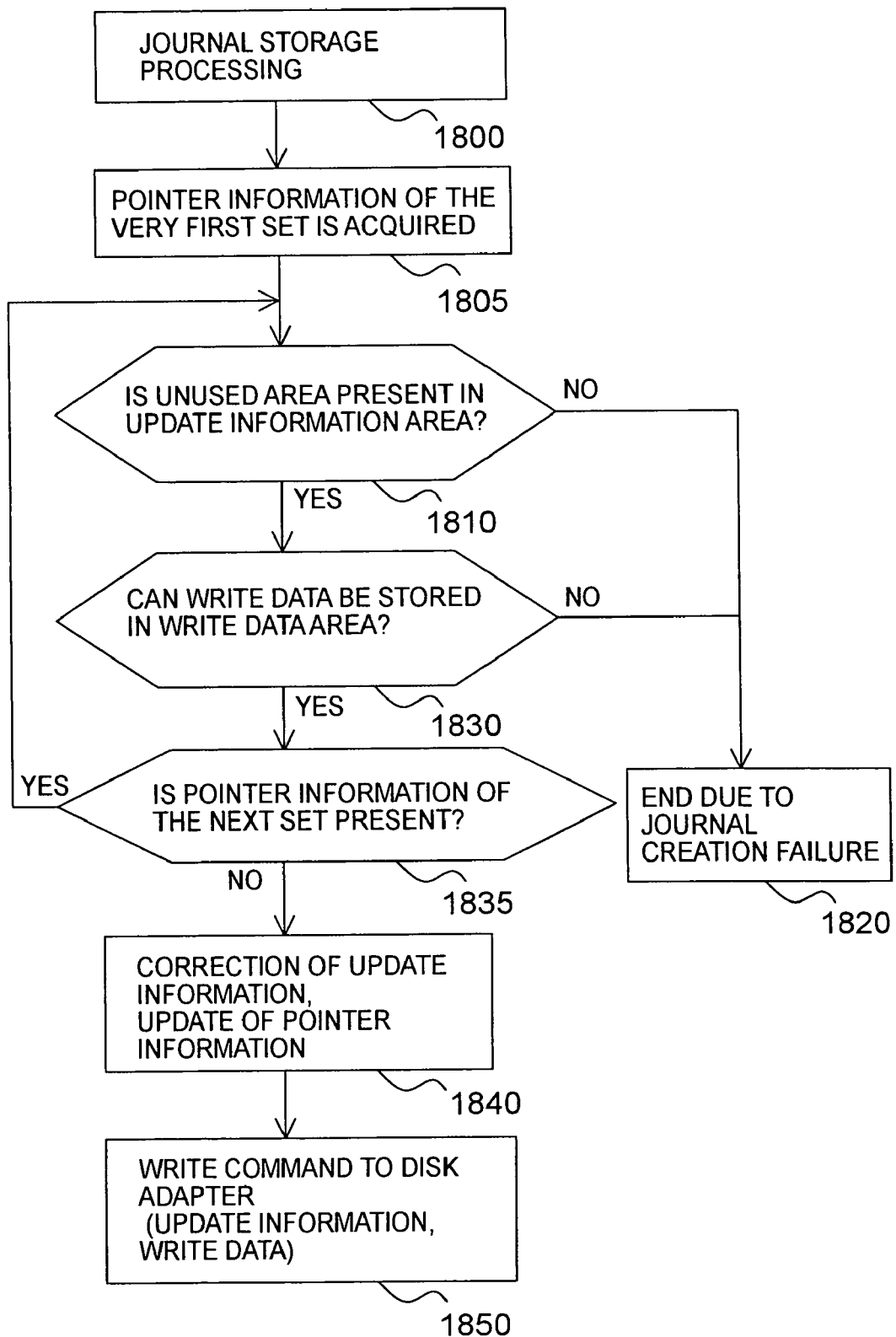
FIG. 20 is a flow chart illustrating the procedure of journal storage processing of the first embodiment.

FIG. 18 illustrates the data flow in the journal read (JNLRD) processing 240. FIG. 19 is a flow chart illustrating the procedure of the journal read processing 240. FIG. 20 is a flow chart illustrating the procedure of journal storage processing conducted in the course of the journal read processing 240. The operation in which the channel adapter 110 of the auxiliary storage system 100B reads out the journals from the primary storage system 100A and stores them in the journal logical volume will be described hereinbelow by using those drawings.

(1) The channel adapter 110 located in the auxiliary storage system 100B reserves the cache memory 130 for storing the journals and transmits to the primary storage system 100A the identifier indicating that this is the journal read command, the group number of the primary storage system 100A of the command object, and the access command (journal read command) indicating the presence or absence of the retry indication (step 1700; 1610 in FIG. 18). The group number in the access command is hereinbelow considered as a group number "A".

(2) The channel adapter 110 receives the response of the primary storage system 100A and the journals (1620 in FIG. 18). The channel adapter 110 examines the response from the primary storage system 100A and, when the response is "no journals", transmits the read journal command to the primary storage system 100A after the fixed time because no journal of the designated group is present in the primary storage system 100A (steps 1720, 1725).

(4) When the response of the primary storage system 100A is "group state is failure" or "group state is unused", the channel adapter 110 changes the group state of the auxiliary storage system 100B to the received state and ends the journal read processing (steps 1730, 1735).

(5) When the response of the primary storage system 100A is other than the above-described responses, in other words, when it is normal end, the channel adapter 110 examines the volume state of the journal logical volume (step 1740). When the volume state of the journal logical volume is "abnormal", it is impossible to store the journals in the journal logical volume. Therefore, the channel adapter 110 changes the group state to "abnormal" and ends the processing (step 1745) In this case, the channel adapter 110 changes the journal logical volume to a normal logical volume and returns the group state to normal.

(6) When the examination of step 1740 shows that the volume state of the journal logical volume is "normal", the channel adapter 110 conducts the below-described journal store processing 1800. When the journal store processing 1800 ends normally, the channel adapter 110 immediately transmits the next journal read command, or transmits the next journal read command after the fixed time interval (step 1760). The timing for transmitting the next journal command may be such that the commands are sent periodically with a constant time spacing, and this time spacing may be controlled according to the number of received journals, communication capacity of the connection line 200, storage capacity of the journals held in the auxiliary storage system 100B, or the load of the auxiliary storage system 100B. Furthermore, the storage capacity of the journals held in the primary storage system 100A and pointer information of the primary storage system 100A may be read by the auxiliary storage system 100B and the aforesaid time spacing may be controlled according to the numerical values thereof. Transfer of the above-described information may be also conducted by a special command and may be contained in the response of the journal read command. Subsequent processing is identical to that conducted after step 1710.

(7) When the journal store processing of step 1800 has not ended normally, the unused area of the journal logical volume is insufficient. Therefore, the channel adapter 110 destroys the received journals and transmits the journal read command with retry indication after a fixed interval (step 1755). Alternatively, the channel adapter 110 holds the journals in the cache memory and again conducts the journal store processing after a fixed interval. This is done because the unused area can be added to the journal logical volume after a fixed interval by conducting the below described restore processing 250. When such a method is used, the presence or absence of the retry indication in the journal read command is unnecessary.

The above-mentioned journal store processing 1800 will be described below with reference to FIG. 20.

(1) The channel adapter 110 of the auxiliary storage system acquires the pointer information 700 of the very first set (step 1805). The channel adapter 110 of the auxiliary storage system examines whether the journal can be stored in the journal logical volume. Thus, the channel adapter 110 uses the pointer information 700 and examines as to whether or not the unused area is present in the update information area (step 1810). When the update information newest address and the update information oldest address of the pointer information 700 are equal to each other, no unused area is present in the update information area. Therefore, the channel adapter 110 ends the processing as a journal creation failure (step 1820).

(2) When the examination of step 1810 shows that an unused area is present in the update information area, the channel adapter 110 uses the pointer information 700 and examines as to whether write data are present in the write data area (step 1830). When the sum of the newest address and the data quantity of write data of the received journal is equal to or larger than the write data oldest address, the write data cannot be stored in the write data area. Therefore, the channel adapter 110 ends the processing as a journal creation failure (step 1820). The channel adapter 110 repeats the steps 1810 through 1830 with respect to the pointer information 700 of the next set as long as the pointer information 700 of the next set is present.

(3) When the journals can be stored, the channel adapter 110 changes the group number of the received update information and the logical address of the journal logical volume. The group number is changed to the group number of the auxiliary storage system 100B, and the logical address of the journal logical volume is changed to the write data newest address of pointer information 700. The channel adapter 110 changes the update information newest address of pointer information 700 to a numerical value obtained by adding the size of update information to the update information newest address. The channel adapter 110 changes the write data newest address of pointer information 700 to a numerical value obtained by adding the size of write data to the write data newest address (step 1840). When a plurality of sets of pointer information corresponding to a plurality of auxiliary storage systems are present, the channel adapter 110 changes all those multiple sets of pointer information 700 in the above-described manner.

(4) The channel adapter 110 instructs the disk adapter 120 to write the update information and write data into the storage unit 150 and ends the processing as a journal creation success (step 1850; 1630 in FIG. 18). Then, the disk adapter 120 writes the update information and write data into the physical storage unit 150 by read-write processing 220 and releases the cache memory 130 (1640 in FIG. 18).

In the above-descried journal storage processing, the journals are saved from the cache memory 130 into the physical storage unit 150 at an appropriate timing. As a modification example, the cache memory 130 of fixed capacity may be prepared in advance for the journals and the journals may be saved in the physical storage unit 150 at a stage at which the entire cache memory was used. The capacity of the cache memory for journals may be designated, for example, from the maintenance terminal.

Figure 21:
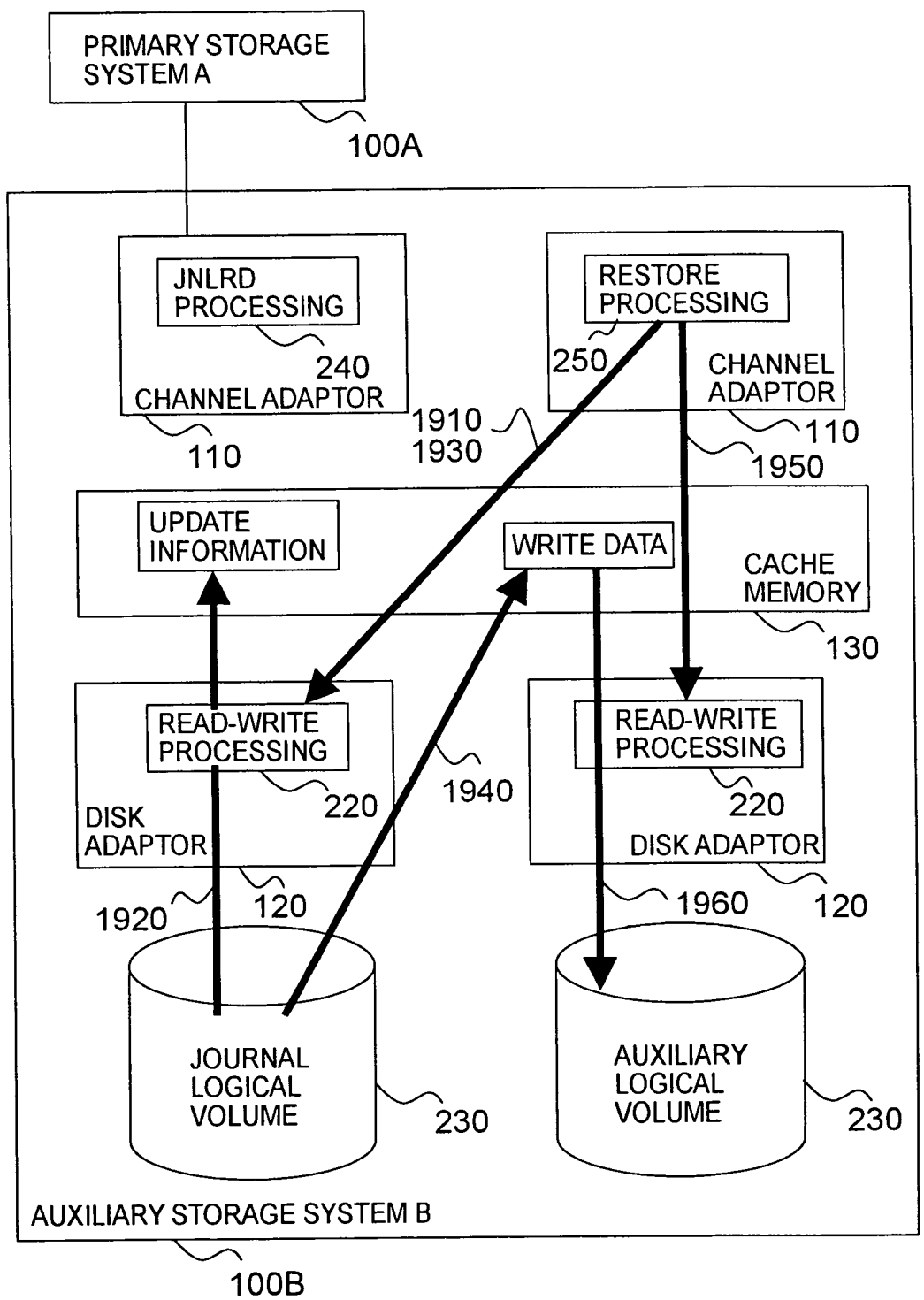
FIG. 21 illustrates a data flow in the restore processing of the first embodiment.
Figure 22:
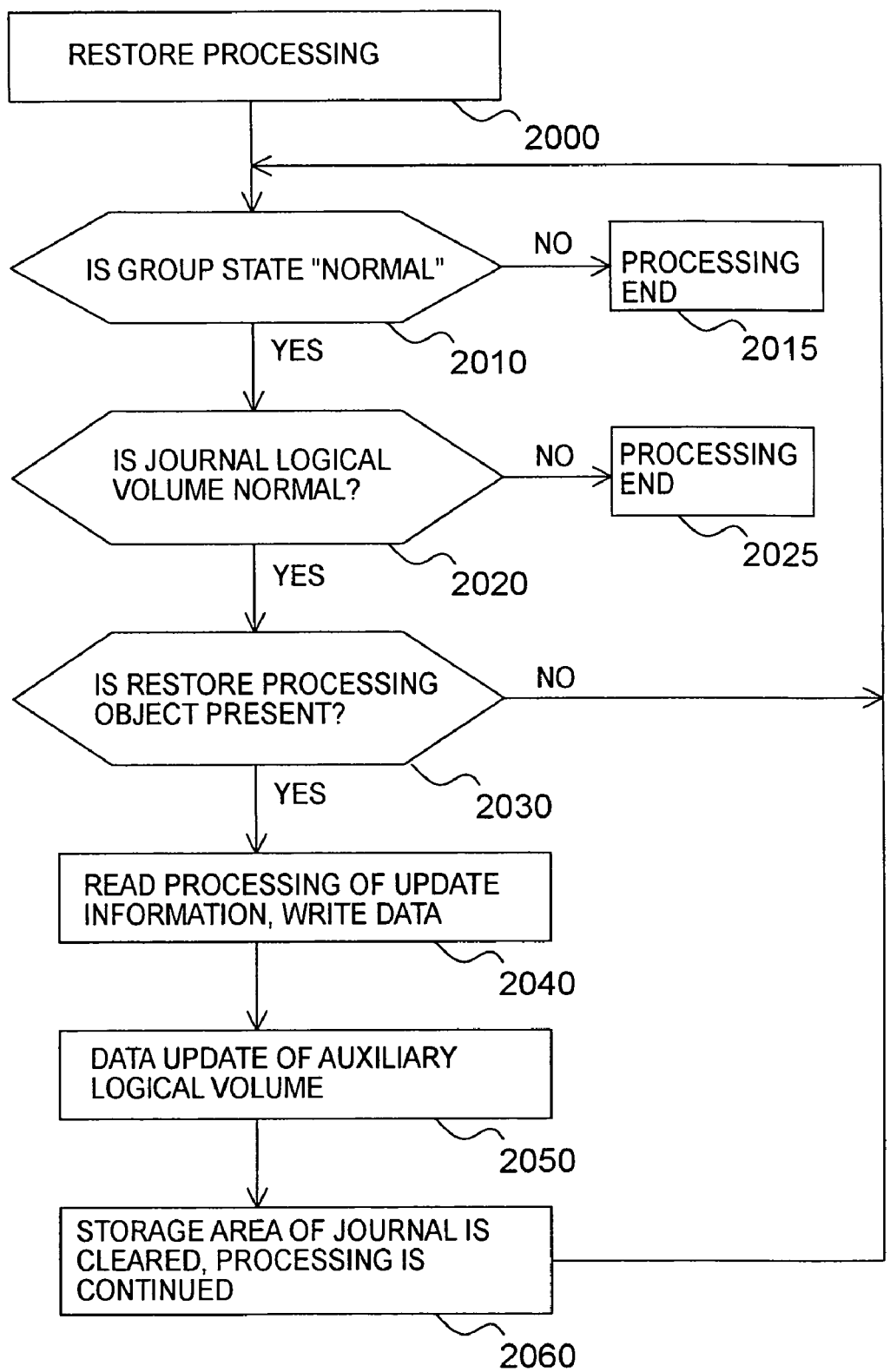
FIG. 22 is a flow chart illustrating the procedure of restore processing of the first embodiment.

FIG. 21 illustrates the data flow in the restore processing 250. FIG. 22 is a flow chart illustrating the procedure of restore processing 250. The operation in which the channel adapter 110 of the auxiliary storage system 100B uses the journals and conducts data update will be explained below by using those figures. As a modification example, the restore processing 250 may be also conducted with the disk adapter 120 of the auxiliary storage system 100B.

(1) The channel adapter 110 of the auxiliary storage system 100B examines as to whether the group state with the group number B is "normal" (step 2010). When the examination of step 2010 shows that the group state is other than "normal", for example, when it is "failure", the channel adapter 110 ends the restore processing (step 2015).

(2) When the examination of step 2010, shows that the group state is "normal", the channel adapter 110 examines the volume state of the journal logical volume (step 2020).

When the examination of step 2020 shows that the volume state of the journal logical volume is "abnormal", the access is impossible. Therefore, the channel adapter 110 changes the group state to "abnormal" and ends the processing (step 2025).

(3) When the examination of step 2020 shows that the volume state of the journal logical volume is "normal", the channel adapter 110 examines as to whether the journal of the restore object is present. Thus, the channel adapter 110 acquires the update information oldest address and update information newest address of pointer information 700. When the update information newest address and the update information oldest address are equal to each other, the journal is not present. Therefore, the channel adapter 110 temporarily ends the restore processing and restarts the restore processing after a fixed interval (step 2030).

(4) When the examination of step 2030 shows that a journal of the restore object is present, the channel adapter 110 conducts the next processing with respect to the journal having the oldest (smallest) update number. The update information of the journal having the oldest (smallest) update number is saved from the update information newest address of the pointer information 700. The 110 reserves the cache memory 130 and instructs the disk adapter 120 to read the data (update information) of the size of the update information from the update information newest address to the cache memory 130 (1910 in FIG. 21).

The read-write processing 220 of the disk adapter 120 comprises reading update information from the physical storage unit 150, saving in the cache memory 130, and notifying the channel adapter 110 about the update information read end (1920 in FIG. 21).

The channel adapter 110 receives the notification about the update information read end, acquires the logical address of write data and the size of write data from the update information, reserves the cache memory 130, and instructs the disk adapter 120 to read the write data into the cache memory (1930 in FIG. 21).

The read-write processing 220 of disk adapter 120 comprises reading the write data from the physical storage unit 150, saving it in the cache memory 130, and notifying the channel adapter 110 about the write data read end (step 2040; 1940 in FIG. 21).

(5) The channel adapter 110 finds the logical address of the auxiliary logical volume which is updated from the update information and instructs the disk adapter 120 to write the word data into the auxiliary logical volume (step 2050; 1950 in FIG. 21). The read-write processing 220 of the disk adapter 120 comprises writing the data into the storage zone of the physical storage unit 150 corresponding to the logical address of the auxiliary logical volume, releasing the cache memory 130, and notifying the channel adapter 110 about the data write completion (1960 in FIG. 21).

(6) The channel adapter 110 receives the notification about the data write completion and releases the storage area of the journals. In the release processing of the storage area of the journals, the update information oldest address of pointer information 700 is changed to a numerical value obtained by adding the size of the update information thereto. When the update information oldest address becomes the word data area head address, the update information oldest address is considered to be "0". The word data oldest address of pointer information 700 is changed to a numerical value obtained by adding the word data size thereto. When the word data oldest address becomes a logical address equal to or larger than the capacity of the journal logical volume, the word data area head address is corrected so as to be reduced. The channel adapter 110 thereafter starts the next restore processing (step 2060).

In the above-mentioned restore processing 250, the journal is read from the physical storage unit 150 into the cache memory 130. However, this operation is not required when the journal has already been present in the cache memory 130.

In the above-described journal read reception processing and journal read processing 240, the primary storage system 100A determines the journal which is to be transmitted based on the pointer information 700. As a modification example, the auxiliary storage system 100B may determine the journal which is to be transmitted. In this case, the auxiliary storage system 100B can, for example, add the update number to the journal read command. In this case, a table or a search method for finding the logical address where the update information was stored from the update number can be provided in the shared memory 140 of the primary storage system 100A, thereby making it possible for the primary storage system 100A to find the logical address of the update information from the update number designated by the auxiliary storage system 100B in the journal read reception processing.

In the above-described journal read reception processing and journal read processing 240, a special access command which is a journal read command is used. As a modification example, the usual read command may be used. In this case, for example, the group information 600 and pointer information 700 of the primary storage system 100A can be transferred in advance into the auxiliary storage system 100B, and the auxiliary storage system 100B can generate a read command for reading the data (in other words, the journal) of the journal logical volume present in the primary storage system 100A based on the group information 600 and pointer information 700.

In the above-described journal read reception processing, the journals are sequentially transmitted from the primary storage system 100A to the auxiliary storage system 100B in the order of update numbers. As a modification example, the journals may be transmitted in the order different from that of the update numbers. Alternatively, a plurality of journals may be transmitted in parallel from the primary storage system 100A to the auxiliary storage system 100B. In this case, a table or a search method for finding the logical address where the update information was stored from the update number can be provided in the auxiliary storage system 100B, thereby making it possible to process the journals in the order of update numbers in the restore processing 250 of the auxiliary storage system 100B.

In the present embodiment, the primary storage system 100A acquires the journals, the auxiliary storage system 100B reads the journals from the primary storage system 100A, and data copying is conducted based thereon. As a result, the host computer 180 connected to the primary storage system 100A bears no load relating to data copying. Furthermore, because the journals are transferred between the primary storage system 100A and the auxiliary storage system 100B, the communication line between the primary storage system 100A and the host computer 180 is not used for data copying.

Figure 23:
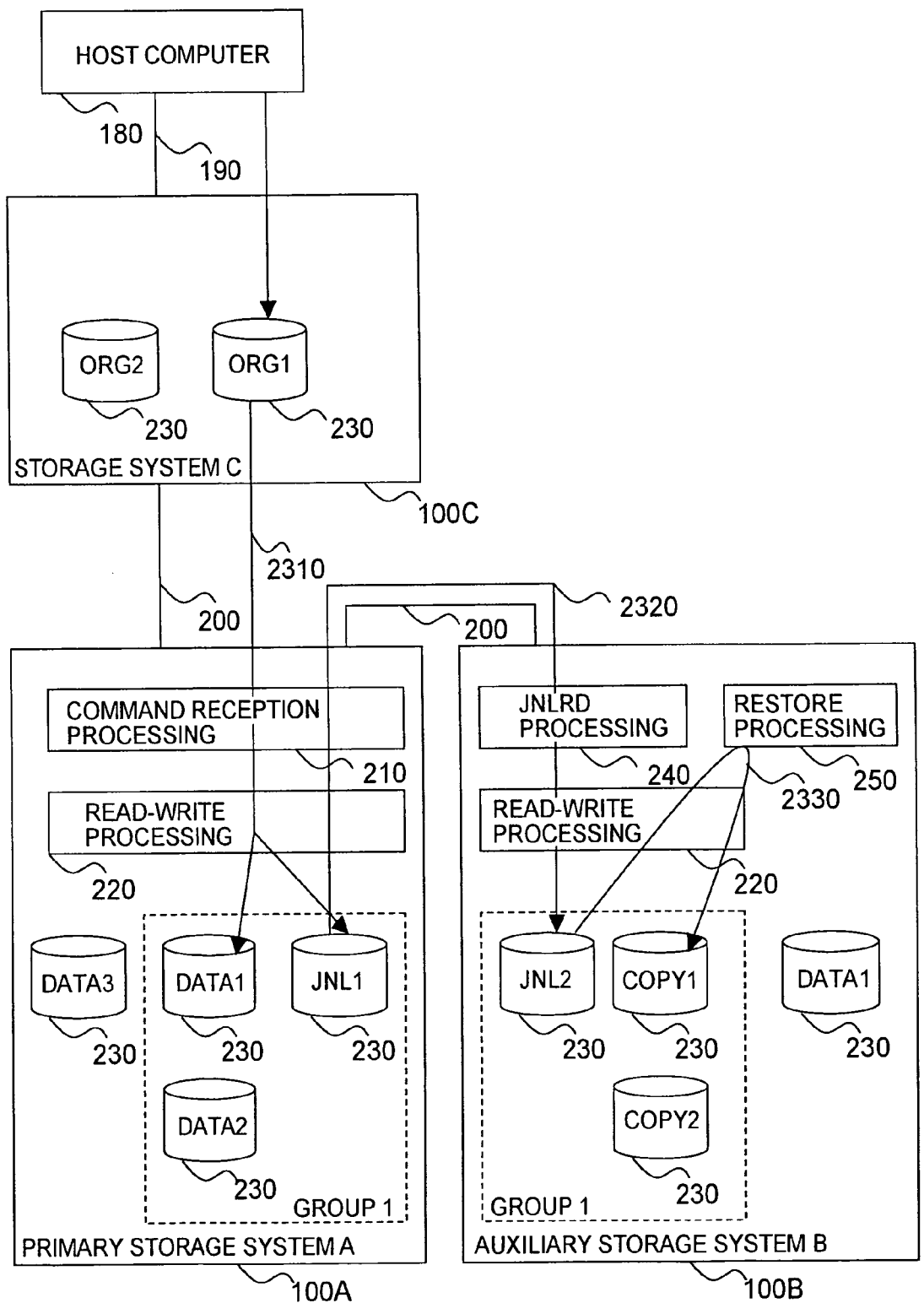
FIG. 23 illustrates the logical structure of the second embodiment of the present invention.

FIG. 23 illustrates the logical configuration of the second embodiment of the data processing system in accordance with the present invention.

As shown in FIG. 23, in the present embodiment, a third storage system 100C is added to the primary storage system 100A and the auxiliary storage system 100B. The physical configuration of the storage systems 100A, 100B, and 100C basically may be identical to the configuration that has already been explained with reference to FIG. 1. The host computer 180 and the third storage system 100C are connected by a connection path 190, the third storage system 100C and the primary storage system 100A are connected by the connection path 200, and the primary storage system 100A and the auxiliary storage system 100B are connected by the connection path 200. The third storage system 100C comprises original logical volumes ("ORG 1", "ORG 2", and the like) 230 holding respective data on the source of data in the primary logical volumes "DATA 1", "DATA 2", and the like) 230 in the primary storage system 100A.

The third storage system 100C updates the data (original data) in the required original logical volume (for example, "ORG 1") 230 in response to a data write command from the host computer 180. At this time, the third storage system 100C not only updates the original data present in the original logical volume (for example, "ORG 1") 230, but also sends to the primary storage system 100A the data write command for updating the data present in the primary logical volume ("DATA 1") 230 corresponding to the original data of the update object (step 2310).

The primary storage system 100A, as was explained in the first embodiment, receives the aforesaid data write command, updates the data of the required primary logical volume (for example "DATA 1") 230, and saves the journals of the data update in the journal logical volume ("JNL 1") 230 by the above-described command reception processing 210 and read-write processing 220 (step 2310).

The auxiliary storage system 100B reads the journals from the primary storage system 100A by the above-described journal read processing 240 and saves the journals in the journal logical volume ("JNL 2") 230 by the read-write processing 220. (2320).

If the journal read command is received from the auxiliary storage system 100B, the primary storage system 100A reads the journals from the journal logical volume ("JNL 1") 230 by the command reception processing 210 and read-write processing 220 and sends them to the auxiliary storage system 100B (2320).

The auxiliary storage system 100B reads the journals from the journal logical volume ("JNL 2") in the order of update numbers by the above-described restore processing 250 and read-write processing 220 and updates the data of the auxiliary logical volume (COPY 1) which is the copy of the primary logical volume ("DATA 1") 230 (2330). Thus, updating the data in the order of update numbers makes it possible to maintain the compatibility of data between the logical volumes.

In the data processing system shown in FIG. 23, the primary storage system 100A acquires the journals and stores them in a storage area specifically allocated for journals. Furthermore, the auxiliary storage system 100B stores the journals received from the primary storage system in a storage area specifically allocated for journals. In this system, the storage area specifically allocated for journals can be made less than the storage area for data copying object, and copying of data form the primary storage system to the auxiliary storage system can be conducted with a smaller storage capacity.

Figure 24:
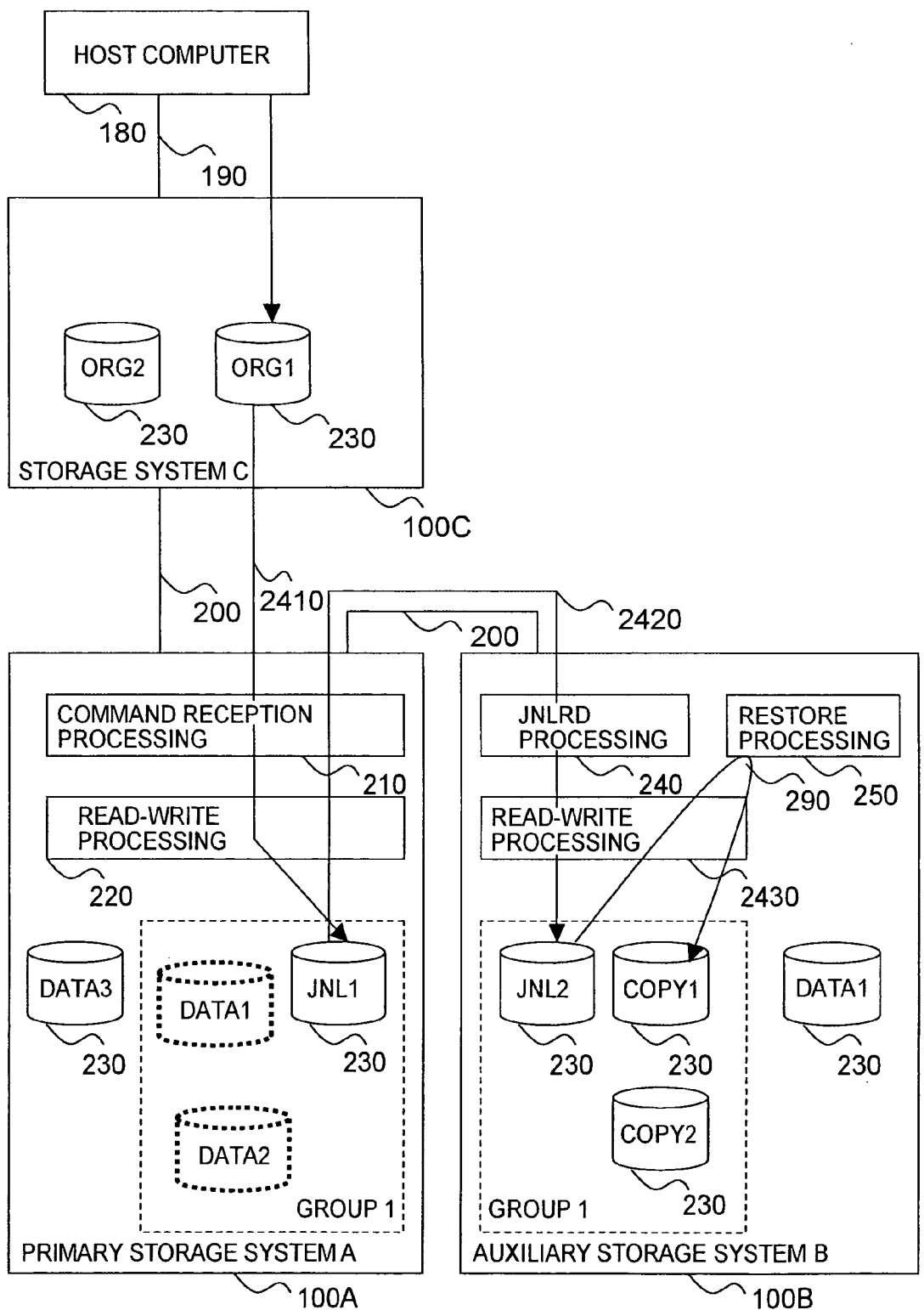
FIG. 24 illustrates the logical structure of the third embodiment of the present invention.

FIG. 24 illustrates the logical configuration of the third embodiment of the data processing system in accordance with the present invention.

As shown in FIG. 24, in the present embodiment, a third storage system 100C is added to the primary storage system 100A and the auxiliary storage system 100B. The physical configuration of the storage systems 100A, 100B, and 100C basically may be identical to the configuration that has already been explained with reference to FIG. 1. The host computer 180 and the third storage system 100C are connected by the connection path 190, the third storage system 100C and the primary storage system 100A are connected by the connection path 200, and the primary storage system 100A and the auxiliary storage system 100B are connected by the connection path 200.

The primary storage system 100A shows the third storage system 100C as if the primary logical volumes ("DATA 1", "DATA 2", and the like) are present, but does not allocate the actual physical storage area, that is, the physical storage unit 150, for the primary logical volumes ("DATA 1", "DATA 2", and the like). For example, the prescribed numerical value is set, this value indicating that no physical storage unit 150 was allocated from the physical addresses of each primary logical volume in the volume information 400. Therefore, the primary logical volumes ("DATA 1", "DATA 2", and the like) in the primary storage system 100A are virtual. The primary storage system 100A has the journal logical volume ("JNL 1") 230 for saving the journal of data update of those virtual primary logical volumes ("DATA 1", "DATA 2", and the like), and the actual physical storage areas are allocated thereto. The third storage system 100C has original logical volumes (for example "ORG 1", "ORG 2", and the like) 230 where the actual data equivalent to the data in the virtual primary logical volumes ("DATA 1", "DATA 2", and the like) in the primary storage system 100A were saved, and the actual physical storage areas are allocated thereto.

The third storage system 100C updates the data (original data) of the required original logical volume (for example, "ORG 1") in response to the data write command from the host computer 180. At this time, the third storage system 100C not only updates the original data, but also sends to the primary storage system 100A a data write command for updating the data present in the virtual primary logical volume (for example "DATA 1") corresponding to the updated original data (2410).

If the primary storage system 100A receives the write command for the data present in the virtual primary logical volume (for example "DATA 1") from the third storage system 100C, it saves the journal of the data update in the journal logical volume ("JNL 1") 230, without conducting the processing (issuance of a data write command to the disk adapter) of step 1270 of the command reception processing 210 shown in FIG. 13 (2410).

The auxiliary storage system 100B reads the journals from the primary storage system 100A by the above-described journal read processing 240 and saves them in the journal logical volume ("JNL 2") 230 by the read-write processing 220 (2420).

If the primary storage system 100A receives the journal read command from the auxiliary storage system 100B, it reads the journals from the journal logical volume ("JNL 1") 230 by the command reception processing 210 and read-write processing 220 and transmits the journals to the auxiliary storage system 100B (2420).

The auxiliary storage system 100B reads the journals from the journal logical volume ("JNL 2") 230 according to the update number by the above-described restore processing 250 and read-write processing 220 and updates the data of the auxiliary logical volume (for example "COPY 1") 230 which is the copy of the original logical volume (for example "ORG 1") 230 (2430). Thus, the compatibility of data between the logical volumes can be maintained by updating the data in the order of update numbers.

In the data processing system shown in FIG. 24, when a failure occurs in the third storage system 100C or the host computer 180 connected to the third storage system 100C, the journal ("JNL 1") 230 present in the primary storage system 100A is reflected in the logical volume (for example "COPY 1") 230 of the auxiliary storage system 100B, thereby making possible the reference to and update of the newest data with the host computer (not shown in FIG. 24) connected to the auxiliary storage system 100B. Furthermore, it is possible to reduce the quantity of information necessary for data copying by storing only the journals, without holding the copy of the original data in the primary storage system 100A.

Figure 25:
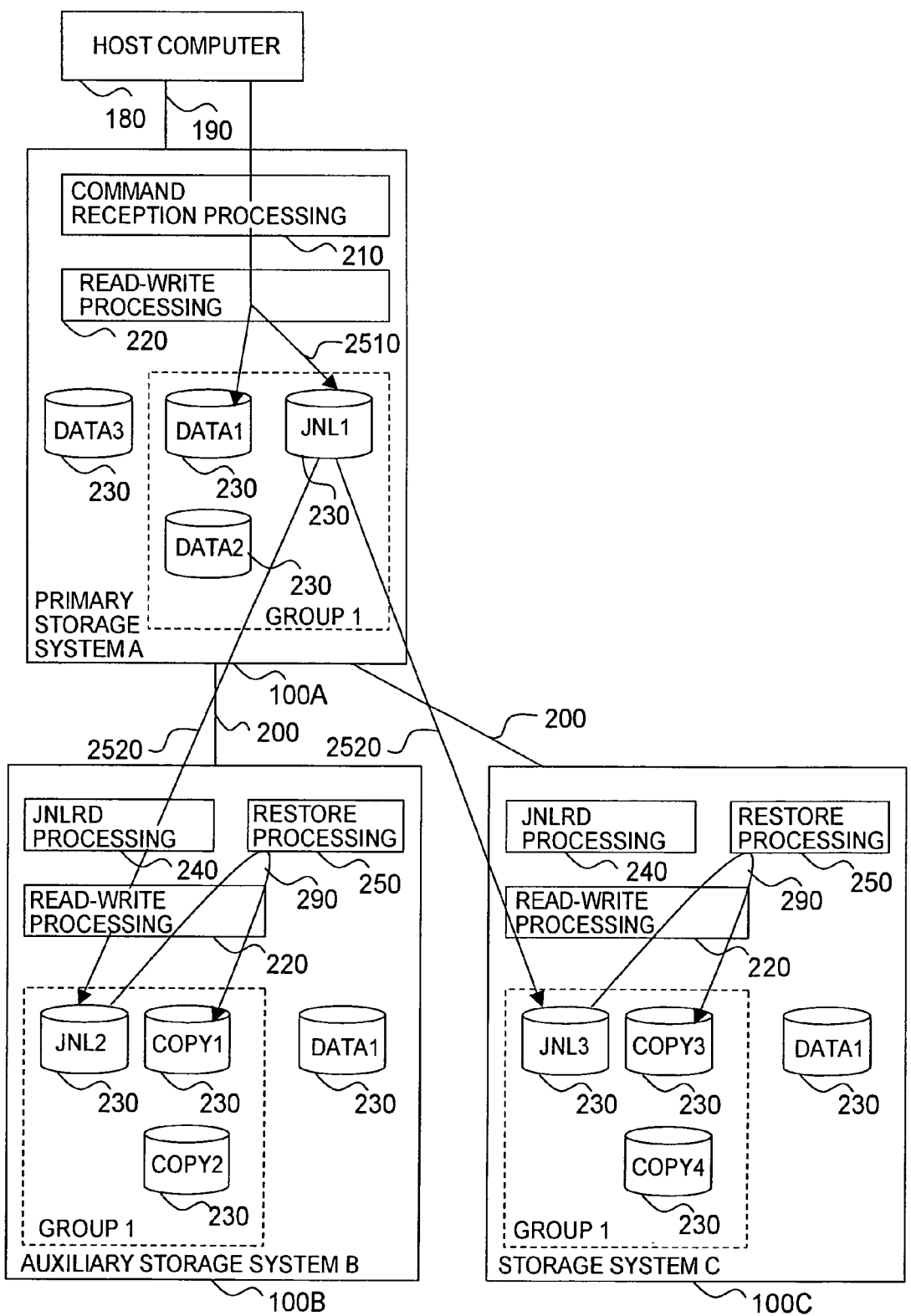
FIG. 25 illustrates the logical structure of the fourth embodiment of the present invention.

FIG. 25 illustrates the logical configuration of the fourth embodiment of the data processing system in accordance with the present invention.

As shown in FIG. 25, this embodiment comprises a primary storage system 100A and a plurality (for example, two) auxiliary storage systems 100B, 100C. Physical structures of all those storage systems 100A, 100B, 100C may be basically identical to those that have already been explained with reference to FIG. 1. The host computer 180 and the primary storage system 100A are connected by a connection path 190, the primary storage system 100A and the first auxiliary storage system 100B are connected by a connection path 200, and the primary storage system 100A and the second auxiliary storage system 100C are connected by a connection path 200. In the primary storage system 100A, the prescribed plurality of primary logical volumes (for example, "DATA 1", "DATA 2") 230 and journal logical volume (for example, "JNL 1") 230 constitute one group "group 1". In the first auxiliary storage system 100B, a plurality of auxiliary logical volumes (for example, "COPY 1", "COPY 2") 230 which are the respective copies of the plurality of primary logical volumes ("DATA 1", "DATA 2") 230 belonging to the above-mentioned "group 1" and the journal logical volume (for example, "JNL 2") 230 constitute the same group "group 1". Similarly, in the second auxiliary storage system 100C, a plurality of auxiliary logical volumes (for example, "COPY 3", "COPY 4") 230 which are the respective copies of primary logical volumes ("DATA 1", "DATA 2") 230 of "group 1" and the journal logical volume (for example, "JNL 3") constitute the same group "group 1".

Figure 27:
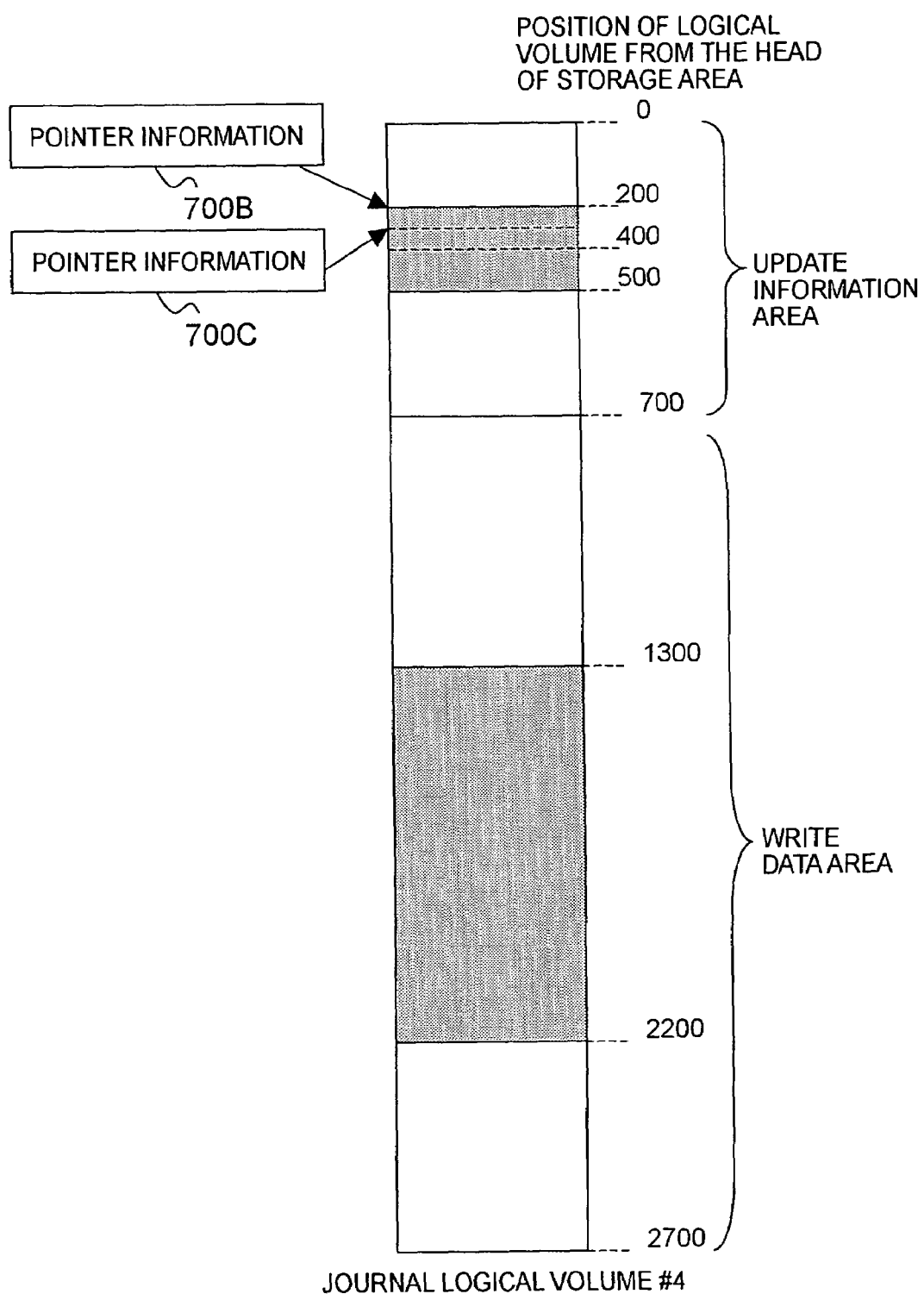
FIG. 27 illustrates the relation between the pointer information and the journal logical volume of the fourth embodiment.

Because a plurality of auxiliary storage systems 100B, 100C are present for one primary storage system 100A, as shown as an example in FIG. 26, a plurality of sets of pointer information 700B, 700C corresponding to respective auxiliary storage systems 100B, 100C are held in the primary storage system 100A. The pointer information 700B for the first auxiliary storage system 100B is held in the first auxiliary storage system 100B, and the pointer information 700C for the second auxiliary storage system 100C is held in the second auxiliary storage system 100C. The structure and meaning of those sets of pointer information 700B, 700C are identical to those that have already been explained with reference to FIG. 8 and FIG. 9. The different auxiliary storage systems 100B, 100C conduct the journal read processing 240 and restore processing 250 according to respective independent schedules. Therefore, as shown in FIG. 27, the addresses indicated by the pointer information 700B, 700C for the different auxiliary storage systems 100B, 100C are not necessarily identical.

The operation of this embodiment will be explained hereinbelow with reference to FIG. 25.

If the primary storage system 100A receives a write command with respect to the data of a certain primary logical volume (for example "DATA 1") 230 from the host computer 180, it updates the required data within the primary logical volume (for example "DATA 1") 230 by the above-described command reception processing 210 and read-write processing 220 and holds the journal of this data update in the journal logical volume ("JNL 1") (2510).

The first auxiliary storage system 100B reads the journals from the primary storage system 100A by the above-described journal read processing 240, and holds this journal in the journal logical volume ("JNL 2") by the read-write processing 220 (2520). Here, the timing at which the first auxiliary storage system 100B reads the journals (the timing of sending the journal read command to the primary storage system 100A) is independently scheduled by the channel adapter 110 of the first auxiliary storage system 100B. This journal read timing, as has already been explained with reference to step 1760 shown in FIG. 19, may be, for example, immediately after the normal end of journal storage processing 1800 of the previous journal, or after a fixed interval elapses since the normal end of journal storage processing 1800 of the previous journal, or periodically with a fixed time spacing. When the journal read command is sent periodically, this time interval may be controlled according to the number of received journals, communication capacity of connection path 200, storage capacity of the journals held by the first auxiliary storage system 100B, or the load of the first auxiliary storage system 100B. Furthermore, the first auxiliary storage system 100B reads the storage capacity of the journals held by the primary storage system 100A or the pointer information of the primary storage system 100A, and the above-mentioned time interval may be controlled based on the numerical values thereof. Transfer of this information may be conducted by a special command or may be contained in the response to the journal read command. In any case, it is not necessary that the timing for reading the journals be synchronized with the other auxiliary storage system 100C.

If the primary storage system 100A receives a command for reading a journal from the auxiliary storage system 100B, it reads the journal from the journal logical volume ("JNL 1") and transmits it to the first auxiliary storage system 100B by the command reception processing 210 and read-write processing 220 (2520).

The first auxiliary storage system 100B reads the journal from the journal logical volume ("JNL 2") according to the update number by the above-described restore processing 250 and read-write processing 220 and updates the data of the auxiliary logical volume ("COPY 1") which is the copy of the primary logical volume ("DATA 1") (290). Thus, the compatibility of data between the logical volumes can be maintained by updating the data in the order of update numbers.

The second auxiliary storage system 100C reads the journal from the primary storage system 100A by the above-described journal read processing 240 and saves the journal in the journal logical volume ("JNL 3") by the read-write processing 220 (2520). Here, the timing at which the second auxiliary storage system 100C reads the journals (the timing of sending the journal read command to the primary storage system 100A) is independently scheduled by the channel adapter 110 of the second auxiliary storage system 100C. This journal read timing, as has already been explained with reference to step 1760 shown in FIG. 19, may be, for example, immediately after the normal end of journal storage processing 1800 of the previous journal, or after a fixed interval elapses since the normal end of journal storage processing 1800 of the previous journal, or periodically with a fixed time spacing. When the journal read command is sent periodically, this time interval may be controlled according to the number of received journals, communication capacity of connection path 200, storage capacity of the journals held by the second auxiliary storage system 100C, or the load of the second auxiliary storage system 100C. Furthermore, the second auxiliary storage system 100C reads the storage capacity of the journals held by the primary storage system 100A or the pointer information of the primary storage system 100A, and the above-mentioned time interval may be controlled based on the numerical values thereof. Transfer of this information may be conducted by a special command or may be contained in the response to the journal read command. In any case, it is not necessary that the timing for reading the journals be synchronized with the other auxiliary storage system 100B.

If the primary storage system 100A receives a command for reading a journal from the second auxiliary storage system 100C, it reads the journal from the journal logical volume ("JNL 1") and transmits it to the second storage system 100C by the command reception processing 210 and read-write processing 220 (2520).

The second auxiliary storage system 100C reads the journal from the journal logical volume ("JNL 3") according to the update number by the above-described restore processing 250 and read-write processing 220 and updates the data of the auxiliary logical volume ("COPY 3") which is the copy of the primary logical volume ("DATA 1") (290). Thus, the compatibility of data between the logical volumes can be maintained by updating the data in the order of update numbers.

As described hereinabove, different auxiliary storage systems 100B, 100C conduct the journal read processing 240 and restore processing 250 with the independently scheduled timing. The auxiliary storage systems 100B, 100C send to the primary storage system 100A the respective notifications about the end of restore processing (or journal read processing) containing the update number at which the restore processing (or journal read processing) was ended, if the restore processing (or journal read processing) has ended. The primary storage system 100A manages the information indicating which of the auxiliary storage systems 100B, 100C has ended the restore processing (or journal read processing) and at which update number the processing was ended, based on the restore processing (or journal read processing) end notification from the auxiliary storage systems 100B, 100C. Then, based on this information, the primary storage system 100A releases the storage areas of respective journals in the journal logical volume ("JNL 1") 230 with respect to the journals with the update numbers for which the restore processing (or journal read processing) has ended in all the auxiliary storage systems 100B, 100C. With respect to the journal with an update number for which the restore processing (or journal read processing) has not been ended in any one of the auxiliary storage systems 100B, 100C, the primary storage system 100A retains this journal in the journal logical volume ("JNL 1") 230 and does not release the storage area of this journal.

With the data processing system shown as an example in FIG. 25, even if a failure occurs in one of a plurality of auxiliary storage systems, copying of the primary logical volume can be maintained by the other normal auxiliary storage system. therefore, safety is high.

In the data processing system shown in FIG. 25, two auxiliary storage systems 100B, 100C are present for one primary storage system 100A. As a modification example, three or more auxiliary storage systems 100B, 100C may be provided for one primary storage system 100A.

In the data processing system shown in FIG. 25 a plurality of auxiliary storage systems 100B, 100C read journals in parallel from one primary storage system 100A. As a modification example, in addition to a function of reading the journals from the primary storage system 100A, the auxiliary storage systems 100B, 100C can be also provided with a function of reading journals from other auxiliary storage systems and be able to select as to whether to read the journals from the primary storage system 100A or the other auxiliary storage system. For example, when the load of the primary storage system 100A is low, all the auxiliary storage systems 100B, 100C read the journals from the primary storage system 100A, but when the load of the primary storage system 100A is high, the control can be conducted so that the first auxiliary storage system 100B reads the journals from the primary storage system 100A and then the second auxiliary storage system 100B reads the journals from the first auxiliary storage system 100B.

Several embodiments of the present invention were described hereinabove. With those embodiments, data transfer or data copying can be conducted between a plurality of storage systems, without adversely affecting the host computer of the storage systems or the communication between the storage systems and the computer.

Furthermore, with some embodiments, the data storage area held in a plurality of storage systems can be decreased. Furthermore, with some embodiments, data transfer or data copying between a plurality of storage systems can be conducted effectively and at a high rate, without greatly affecting the operation of the host computer of a plurality of storage systems.

It goes without saying that the present invention is not limited to the above-described embodiments and various modifications can be made without departing from the essence of the present invention.

FIG. 1
180 HOST COMPUTER
100B AUXILIARY STORAGE SYSTEM B
100A PRIMARY STORAGE SYSTEM A

FIG. 2
100A PRIMARY STORAGE SYSTEM A
100B AUXILIARY STORAGE SYSTEM B
180 HOST COMPUTER
210 COMMAND RECEPTION PROCESSING
220 READ-WRITE PROCESSING
240 JNLRD PROCESSING
250 RESTORE PROCESSING
GROUP 1

FIG. 3
POSITION OF LOGICAL VOLUME FROM THE HEAD OF STORAGE AREA
POSITION OF LOGICAL VOLUME FROM THE HEAD OF STORAGE AREA
351 UPDATE INFORMATION AREA
323 WRITE DATA AREA
340 PRIMARY LOGICAL VOLUME
350 JOURNAL LOGICAL VOLUME

FIG. 4

| SET ITEM | I. SETTING VALUE EXAMPLE |
|---|---|
| TIME OF WRITE COMMAND RECEPTION | 1993/3/17, 22:20:10 |
| GROUP NUMBER | 1 |
| UPDATE NUMBER | 4 |
| LOGICAL ADDRESS OF WRITE COMMAND | LOGICAL VOLUME NUMBER: 1 LOCATION OF LOGICAL VOLUME FROM HEAD OF STORAGE AREA: 700 |
| DATA SIZE OF WRITE DATA | 300 |
| LOGICAL ADDRESS OF JOURNAL LOGICAL VOLUME STORING THE WRITE DATA | LOGICAL VOLUME NUMBER: 4 LOCATION OF LOGICAL VOLUME FROM HEAD OF STORAGE AREA: 1500 |

310 UPDATE INFORMATION

FIG. 5

| | | | | | PHYSICAL ADDRESS | |
|---|---|---|---|---|---|---|
| LOGICAL VOLUME NUMBER | VOLUME STATE | FORMAT SYSTEM | CAPACITY (GB) | PAIR NUMBER | STORAGE DEVICE NUMBER | LOCATION FROM THE HEAD |
| 1 | NORMAL | OPEN3 | 3 | 1 | 1 | 0 |
| 2 | NORMAL | OPEN6 | 6 | 2 | 1 | 3 |
| 3 | UNUSED | OPEN6 | 6 | 0 | 1 | 9 |
| 4 | NORMAL | OPEN9 | 9 | 0 | 2 | 0 |
| 5 | NORMAL | OPEN3 | 3 | 0 | 2 | 9 |
| 6 | UNUSED | OPEN6 | 6 | 0 | 2 | 12 |

400 VOLUME INFORMATION

FIG. 6

| PAIR NUMBER | PAIR STATE | PRIMARY STORAGE SYSTEM NUMBER | PRIMARY LOGICAL VOLUME NUMBER | AUXILIARY STORAGE SYSTEM NUMBER | AUXILIARY LOGICAL VOLUME NUMBER | GROUP NUMBER | COPY COMPLETION ADDRESS |
|---|---|---|---|---|---|---|---|
| 1 | NORMAL | 1 | 1 | 2 | 1 | 1 | 0 |
| 2 | NORMAL | 1 | 2 | 2 | 3 | 1 | 0 |
| 3 | UNUSED | 0 | 0 | 0 | 0 | 0 | 0 |
| 4 | UNUSED | 0 | 0 | 0 | 0 | 0 | 0 |
| 5 | UNUSED | 0 | 0 | 0 | 0 | 0 | 0 |

500 PAIR INFORMATION

FIG. 7

| GROUP NUMBER | GROUP STATE | PAIR SET | JOURNAL LOGICAL VOLUME NUMBER | UPDATE NUMBER |
|---|---|---|---|---|
| 1 | NORMAL | 1, 2 | 4 | 4 |
| 2 | UNUSED | 0 | 0 | 0 |

600 GROUP INFORMATION

FIG. 8

| | LOGICAL ADDRESS | | |
|---|---|---|---|
| | AUXILIARY STORAGE SYSTEM NUMBER | LOGICAL VOLUME NUMBER | POSITION OF LOGICAL VOLUME FROM THE HEAD OF STORAGE AREA |
| UPDATE INFORMATION AREA HEAD ADDRESS | 2 | 4 | 0 |
| WRITE DATA AREA HEAD ADDRESS | 2 | 4 | 700 |
| UPDATE INFORMATION NEWEST ADDRESS | 2 | 4 | 500 |
| UPDATE INFORMATION OLDEST ADDRESS | 2 | 4 | 200 |
| WRITE DATA NEWEST ADDRESS | 2 | 4 | 2200 |
| WRITE DATA OLDEST ADDRESS | 2 | 4 | 1300 |
| READ START ADDRESS | 2 | 4 | 400 |
| RETRY START ADDRESS | 2 | 4 | 300 |

FIG. 9
UPDATE INFORMATION AREA HEAD ADDRESS
UPDATE INFORMATION OLDEST ADDRESS
RETRY START ADDRESS
READ START ADDRESS
UPDATE INFORMATION NEWEST ADDRESS
WRITE DATA AREA HEAD ADDRESS
WRITE DATA OLDEST ADDRESS
WRITE DATA NEWEST ADDRESS
POSITION OF LOGICAL VOLUME FROM THE HEAD OF STORAGE AREA
UPDATE INFORMATION AREA
WRITE DATA AREA
JOURNAL LOGICAL VOLUME

FIG. 10
STEP 900
GROUP CREATION (GROUP STATE: NOT YET USED⇒NORMAL
PAIR CATALOG (PAIR STATE: NOT YET COPIED)
STEP 910
JOURNAL LOGICAL VOLUME CATALOG
STEP 920
START OF DATA COPYING PROCESSING
(PAIR STATE "NOT YET COPIED"⇒"BEING COPIED"⇒"NORMAL")
PRIMARY STORAGE SYSTEM 100A STARTS INITIAL COPYING PROCESSING
AUXILIARY STORAGE SYSTEM STARTS JOURNAL READ PROCESSING AND
RESTORE PROCESSING
STEP 930
END OF INITIAL COPY PROCESSING
STEP 940

FIG. 11
INITIAL COPYING PROCESSING
PRIMARY LOGICAL VOLUME A FOR WHICH PAIR STATE IS "NOT YET COPIED" IS ACQUIRED AND PAIR STATE IS CHANGED TO "BEING COPIED"
STEP 1010
IS PRIMARY LOGICAL VOLUME A PRESENT?
STEP 1020
PROCESSING END
STEP 1030
JOURNAL CREATION PROCESSING
STEP 1040
COPYING COMPLETION ADDRESS IS CHANGED
STEP 1050
IS COPYING COMPLETION ADDRESS EQUAL TO THE CAPACITY OF PRIMARY LOGICAL VOLUME?
STEP 1060
PAIR STATE OF PRIMARY LOGICAL VOLUME A IS CHANGED TO "NORMAL"
STEP 1070

FIG. 12
100A PRIMARY STORAGE SYSTEM A
100B AUXILIARY STORAGE SYSTEM B
110 HOST ADAPTOR
110 HOST ADAPTOR
120 DISK ADAPTOR
120 DISK ADAPTOR
130 CACHE MEMORY
180 HOST COMPUTER
210 COMMAND RECEPTION PROCESSING
210 COMMAND RECEPTION PROCESSING
220 READ-WRITE PROCESSING
220 READ-WRITE PROCESSING
230 PRIMARY LOGICAL VOLUME
230 JOURNAL LOGICAL VOLUME
WRITE DATA
UPDATE INFORMATION

FIG. 13
1200 ACCESS COMMAND RECEPTION
1210 IS IT WRITE COMMAND?
1215 IS IT JOURNAL READ COMMAND?
1220 JOURNAL READ RECEPTION PROCESSING
1230 PROCESSING IDENTICAL TO CONVENTIONAL TECHNOLOGY
1240 IS VOLUME STATE "NORMAL" OR "MAIN"?
1245 ABNORMALITY REPORT TO HOST COMPUTER
1250 CACHE MEMORY IS RESERVED, DATA IS RECEIVED
1260 IS VOLUME STATE "MAIN"?
1265 JOURNAL CREATION PROCESSING
1270 WRITE COMMAND TO DISK ADAPTOR
1280 END REPORT TO HOST COMPUTER

FIG. 14
JOURNAL CREATION PROCESSING
1305 POINTER INFORMATION OF INITIAL SET IS ACQUIRED
1310 IS STATE OF JOURNAL LOGICAL VOLUME NORMAL?
1315 PROCESSING END
1320 IS IT COMMAND RECEPTION PROCESSING?
1330 IS LOGICAL ADDRESS OF WRITE COMMAND THE INITIAL COPYING PROCESSING COMPLETION?
1335 PROCESSING END
1340 IS UNUSED AREA PRESENT IN UPDATE INFORMATION AREA?
1345 IS WRITE DATA CAN BE STORED IN WRITE DATA AREA?
1346 IS POINTER INFORMATION OF THE NEXT STEP PRESENT?
1350 UPDATE INFORMATION CREATION
1360 WRITE COMMAND TO DISK ADAPTOR (UPDATE INFORMATION, WRITE DATA
1370 UNUSED AREA PRESENT IN UPDATE INFORMATION AREA?
1375 IS WRITE DATA CAN BE STORED IN WRITE DATA AREA?
1380 UPDATE INFORMATION CREATION
1385 WRITE COMMAND TO DISK ADAPTOR (UPDATE INFORMATION)
1390 END DUE TO JNL CREATION FAILURE

FIG. 15

| SET ITEM | SETTING VALUE EXAMPLE |
|---|---|
| TIME OF WRITE COMMAND RECEPTION | 1993/3/17, 22:20:10 |
| GROUP NUMBER | 1 |
| UPDATE NUMBER | 4 |
| LOGICAL ADDRESS OF WRITE COMMAND | LOGICAL VOLUME NUMBER: 1 LOCATION OF LOGICAL VOLUME FROM HEAD OF STORAGE AREA: 800 |
| DATA SIZE OF WRITE DATA | 100 |
| LOGICAL ADDRESS OF JOURNAL LOGICAL VOLUME STORING THE WRITE DATA | LOGICAL VOLUME NUMBER: 4 LOCATION OF LOGICAL VOLUME FROM HEAD OF STORAGE AREA: 2200 |

310 UPDATE INFORMATION

FIG. 16
100A PRIMARY STORAGE SYSTEM A
100B AUXILIARY STORAGE SYSTEM B
110 CHANNEL ADAPTOR
110 CHANNEL ADAPTOR
120 DISK ADAPTOR
120 DISK ADAPTOR
130 CACHE MEMORY
180 HOST COMPUTER
210 COMMAND RECEPTION PROCESSING
210 COMMAND RECEPTION PROCESSING
220 READ-WRITE PROCESSING
220 READ-WRITE PROCESSING
230 PRIMARY LOGICAL VOLUME
230 JOURNAL LOGICAL VOLUME
WRITE DATA
UPDATE INFORMATION

FIG. 17
1220 JOURNAL READ COMMAND PROCESS
1210 IS THE GROUP STATE "NORMAL"?
1515 GROUP STATE IS REPORTED TO AUXILIARY STORAGE SYSTEM B AND PROCESSING IS ENDED
1520 IS THE STATE OF JOURNAL LOGICAL VOLUME "NORMAL"?
1525 GROUP STATE IS REPORTED TO AUXILIARY STORAGE SYSTEM B AND PROCESSING IS ENDED
1530 IS RETRY INDICATED?
1540 READ PROCESSING OF UPDATE INFORMATION OF RETRY START ADDRESS AND WRITE DATA
1545 JOURNAL IS TRANSMITTED TO AUXILIARY STORAGE SYSTEM B
1550 IS UNTRANSMITTED JOURNAL PRESENT?
1560 "NO JOURNAL" IS REPORTED TO AUXILIARY STORAGE SYSTEM B
1570 READ PROCESSING OF UPDATE INFORMATION OF READ START ADDRESS AND WRITE DATA
1580 JOURNAL IS TRANSMITTED TO AUXILIARY STORAGE SYSTEM B
1590 STORAGE AREA OF JOURNAL IS RELEASED

FIG. 18
100A PRIMARY STORAGE SYSTEM
110 CHANNEL ADAPTER
110 CHANNEL ADAPTER
240 JNLRD PROCESSING
250 RESTORE PROCESSING
UPDATE INFORMATION
WRITE DATA
130 CACHE MEMORY
220 READ-WRITE PROCESSING
220 READ-WRITE PROCESSING
120 DISK ADAPTER
120 DISK ADAPTER
230 JOURNAL LOGICAL VOLUME
230 AUXILIARY LOGICAL VOLUME
100B AUXILIARY STORAGE SYSTEM

FIG. 19
1700 JOURNAL READ COMMAND IS TRANSMITTED TO PRIMARY STORAGE SYSTEM 100A
1710 RESPONSE OF PRIMARY STORAGE SYSTEM 100A IS RECEIVED
1720 IS THE RESPONSE "NO JOURNAL"?
1725 JOURNAL READ COMMAND IS TRANSMITTED AFTER FIXED INTERVAL
1730 IS THE RESPONSE "GROUP STATE IS FAILURE OR UNUSED"?
1735 GROUP STATE CHANGE PROCESSING IS ENDED
1740 IS THE STATE OF JOURNAL LOGICAL VOLUME NORMAL?
1745 GROUP STATE CHANGE PROCESSING IS ENDED
1800 JOURNAL STORAGE PROCESSING
1750 IS JOURNAL STORAGE PROCESSING ENDED NORMALLY?
1755 JOURNAL READ COMMAND OF RETRY INDICATION IS TRANSMITTED AFTER FIXED INTERVAL
1760 JOURNAL READ COMMAND IS TRANSMITTED

FIG. 20
1800 JOURNAL STORAGE PROCESSING
1805 POINTER INFORMATION OF THE VERY FIRST SET IS ACQUIRED

1810 IS UNUSED AREA PRESENT IN UPDATE INFORMATION AREA
1820 END DUE TO JOURNAL CREATION FAILURE
1830 CAN WRITE DATA BE STORED IN WRITE DATA AREA?
1835 IS POINTER INFORMATION OF THE NEXT SET PRESENT?
1840 CORRECTION OF UPDATE INFORMATION, UPDATE OF POINTER INFORMATION
1850 WRITE COMMAND TO DISK ADAPTER (UPDATE INFORMATION, WRITE DATA)

FIG. 21
100A PRIMARY STORAGE SYSTEM A
100B AUXILIARY STORAGE SYSTEM B
110 CHANNEL ADAPTOR
110 CHANNEL ADAPTOR
120 DISK ADAPTOR
120 DISK ADAPTOR
130 CACHE MEMORY
220 READ-WRITE PROCESSING
220 READ-WRITE PROCESSING
230 JOURNAL LOGICAL VOLUME
230 AUXILIARY LOGICAL VOLUME
240 JNLRD PROCESSING
250 RESTORE PROCESSING
WRITE DATA
UPDATE INFORMATION

FIG. 22
2000 RESTORE PROCESSING
2010 IS GROUP STATE "NORMAL"
2015 PROCESSING END
2020 IS JOURNAL LOGICAL VOLUME NORMAL?
2025 PROCESSING END
2030 IS RESTORE PROCESSING OBJECT PRESENT?
2040 READ PROCESSING OF UPDATE INFORMATION, WRITE DATA
2050 DATA UPDATE OF AUXILIARY LOGICAL VOLUME
2060 STORAGE AREA OF JOURNAL IS CLEARED, PROCESSING IS CONTINUED

FIG. 23
180 HOST COMPUTER
100C STORAGE SYSTEM C
210 COMMAND RECEPTION PROCESSING
220 READ-WRITE PROCESSING
240 JNLRD PROCESSING
250 RESTORE PROCESSING
220 READ-WRITE PROCESSING
GROUP 1
GROUP 1
100A PRIMARY STORAGE SYSTEM A
100B AUXILIARY STORAGE SYSTEM B

FIG. 24
180 HOST COMPUTER
100C STORAGE SYSTEM C
210 COMMAND RECEPTION PROCESSING
220 READ-WRITE PROCESSING
240 JNLRD PROCESSING
250 RESTORE PROCESSING
220 READ-WRITE PROCESSING
GROUP 1
GROUP 1
100A PRIMARY STORAGE SYSTEM A
100B AUXILIARY STORAGE SYSTEM

FIG. 25
180 HOST COMPUTER
210 COMMAND RECEPTION PROCESSING
220 READ-WRITE PROCESSING
240 JNLRD PROCESSING
250 RESTORE PROCESSING
220 READ-WRITE PROCESSING
GROUP 1
GROUP 1
GROUP 1
100A PRIMARY STORAGE SYSTEM A
100B AUXILIARY STORAGE SYSTEM
100C STORAGE SYSTEM C

FIG. 26

| | | LOGICAL ADDRESS | |
|---|---|---|---|
| | AUXILIARY STORAGE SYSTEM NUMBER | LOGICAL VOLUME NUMBER | POSITION OF LOGICAL VOLUME FROM THE HEAD OF STORAGE AREA |
| UPDATE INFORMATION AREA HEAD ADDRESS | 2 | 4 | 0 |
| WRITE DATA AREA HEAD ADDRESS | 2 | 4 | 700 |
| UPDATE INFORMATION NEWEST ADDRESS | 2 | 4 | 500 |
| UPDATE INFORMATION OLDEST ADDRESS | 2 | 4 | 200 |
| WRITE DATA NEWEST ADDRESS | 2 | 4 | 2200 |
| WRITE DATA OLDEST ADDRESS | 2 | 4 | 1300 |
| READ START ADDRESS | 2 | 4 | 400 |
| RETRY START ADDRESS | 2 | 4 | 300 |
| 700 POINTER INFORMATION | | | |
| UPDATE INFORMATION AREA HEAD ADDRESS | 3 | 4 | 0 |
| WRITE DATA AREA HEAD ADDRESS | 3 | 4 | 700 |
| UPDATE INFORMATION NEWEST ADDRESS | 3 | 4 | 500 |
| UPDATE INFORMATION OLDEST ADDRESS | 3 | 4 | 300 |
| WRITE DATA NEWEST ADDRESS | 3 | 4 | 2200 |
| WRITE DATA OLDEST ADDRESS | 3 | 4 | 1500 |
| READ START ADDRESS | 3 | 4 | 500 |
| RETRY START ADDRESS | 3 | 4 | 400 |
| 700 POINTER INFORMATION | | | |

FIG. 27
POSITION OF LOGICAL VOLUME FROM THE HEAD OF STORAGE AREA
UPDATE INFORMATION AREA
WRITE DATA AREA
JOURNAL LOGICAL VOLUME #4
700B POINTER INFORMATION
700C POINTER INFORMATION

What is claimed is:

1. A data processing system comprising:
a first storage system communicably connected to a host unit; and
a second storage system and a third storage system each communicably connected to said first storage system, wherein:
(1) said first storage system comprises:
a first data storage area for storing data transmitted from the host unit;
a first journal storage area for storing a journal used for producing a copy of data stored in said first storage area; and
a first control unit which writes the data transmitted from said host unit into said first data storage area, writes the journal of the data written into said first data storage area into said first journal storage area, and transmits said journal present in said first journal storage area to each of said second and third storage systems in response to a read request from each of said second and third storage systems;
(2) said second storage system comprises:
a second data storage area for storing a copy of the data present in said first data storage area;
a second journal storage area for storing said journal; and
a second control unit which schedules a first journal read timing independently from said third storage system, transmits said read request to said first storage system to read said journal from said first storage system at said independently scheduled first journal read timing, writes the read-out journal into said second journal storage area, produces a copy of the data present in said first data storage area based on said journal present in said second journal storage area at an independently scheduled restore timing, and writes the copy into said second data storage area; and
(3) said third storage system comprises:
a third data storage area for storing a copy of the data present in said first data storage area;
a third journal storage area for storing said journal; and
a third control unit which schedules a second journal read timing independently from said second storage system, transmits said read request to said first storage system to read said journal from said first storage system at said independently scheduled second journal read timing, writes the read-out journal into said third journal storage area, produces a copy of the data present in said first data storage area based on said journal present in said third journal storage area at an independently scheduled restore timing, and writes the copy into said third data storage area, and
said first control unit of said first storage system detects as to whether or not said journal present in said first journal storage area has been read by said second and third storage systems, holds said journal present in said first journal storage area till the journal is read by both said second and third storage systems, and can delete said journal present in said first journal storage area after the journal has been read by both said second and third storage systems.

2. The data processing system according to claim 1, wherein
(1) said first storage system comprises:
a plurality of physical storage units;
said first control unit of said first storage system comprises a host adapter for exchanging data with said host device, a disk adapter for exchanging data with said plurality of physical storage units, and a cache memory for storing the data received by said host adapter and the data received by said disk adapter; and
said first control unit allocates the storage areas held by said plurality of physical storage units in said first storage system to said first data storage area and said first journal storage area;
(2) said second storage system comprises:
a plurality of physical storage units;
said second control unit of said second storage system comprises a host adapter for exchanging data with said first storage system, a disk adapter for exchanging data with said plurality of physical storage units, and a cache memory for storing the data received by said host adapter and the data received by said disk adapter; and
said second control unit allocates the storage areas held by said plurality of physical storage units in said second storage system to said second data storage area and said second journal storage area; and
(3) said third storage system comprises:
a plurality of physical storage units;
said third control unit of said third storage system comprises a host adapter for exchanging data with said first storage system, a disk adapter for exchanging data with said plurality of physical storage units, and a cache memory for storing the data received by said host adapter and the data received by said disk adapter; and
said third control unit allocates the storage areas held by said plurality of physical storage units in said third storage system to said third data storage area and said third journal storage area.

3. The data processing system according to claim 1, wherein
said third control unit of said third storage system controls the time interval of said journal read according to the number of data in the journal that has been read from said first journal storage area.

4. The data processing system according to claim 1, wherein
said third control unit of said third storage system controls the time interval of said journal read according to the communication quantity of data exchanged between said first storage system and said third storage system.

5. The data processing system according to claim 1, wherein
said third control unit of said third storage system controls the time interval of said journal read according to the storage capacity of said journal held in said third data storage area.

6. The data processing system according to claim 1, wherein
said third control unit of said third storage system controls the time interval of said journal read according to the processing load of said third storage system.

7. The data processing system according to claim 1, wherein said third control unit of said third storage system reads from said first storage system information relating to the storage capacity of said journal held in said first journal storage area in said first storage system and controls the time interval of said journal read according to the information relating to the storage capacity of said journal that was read out.

8. The data processing system according to claim 1, wherein said first storage system owns management information relating to said first journal storage area; and said third control unit of said third storage system reads from said first storage system the management information relating to said first journal storage area, which is owned by the first storage system, and controls the time interval of said journal read according to the management information relating to said first journal storage area that was read out.

9. The data processing system according to claim 1, wherein said first data storage area in said first storage system has a plurality of logical volumes;

said first control unit writes into said first journal storage area a plurality of journals each corresponding to a plurality of data stored in said plurality of logical volumes;

information relating to an update sequence of said plurality of data, each corresponding to said plurality of journals, is contained in said plurality of journals stored in said first journal storage area; and each of the second and third control units of said second and third storage systems produces copies of said plurality of data based on said plurality of journals according to said update sequence contained in said plurality of journals read out from said first storage system and writes those copies in respective said second and third data storage areas.

10. The data processing system according to claim 1, wherein said third storage system controls said restore timing according to the processing load of said third storage system.

11. The data processing system according to claim 1, wherein said first control unit of said first storage system detects as to whether or not said journal present in said first journal storage area has been read by said second and third storage systems, holds said journal present in said first journal storage area till the journal is read by both said second and third storage systems, and deletes said journal present in said first journal storage area after the journal has been read by both said second and third storage systems.

\* \* \* \* \*